US010394054B2

(12) United States Patent
Varnas

(10) Patent No.: US 10,394,054 B2
(45) Date of Patent: Aug. 27, 2019

(54) PROGRESSIVE SPECTACLE LENS, METHOD OF MANUFACTURING A PROGRESSIVE SPECTACLE LENS, AND METHOD OF DESIGNING A PROGRESSIVE SPECTACLE LENS

(71) Applicant: Carl Zeiss Vision International GmbH, Aalen (DE)

(72) Inventor: Saulius Varnas, Brighton (AU)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/254,536

(22) Filed: Jan. 22, 2019

(65) Prior Publication Data
US 2019/0155057 A1    May 23, 2019

Related U.S. Application Data

(63) Continuation of application No. PCT/EP2017/080886, filed on Nov. 29, 2017.

(30) Foreign Application Priority Data

Dec. 1, 2016   (EP) .................................... 16002581
Jul. 3, 2017   (EP) .................................... 17179412

(51) Int. Cl.
*G02C 7/02*        (2006.01)
*G02C 7/06*        (2006.01)

(52) U.S. Cl.
CPC ............. *G02C 7/066* (2013.01); *G02C 7/027* (2013.01); *G02C 2202/24* (2013.01)

(58) Field of Classification Search
CPC .... G02C 7/066; G02C 7/027; G02C 2202/24; G02C 7/06; G02C 7/061; G02C 7/063; G02C 7/065; G02C 7/068

(Continued)

(56) References Cited

U.S. PATENT DOCUMENTS 8,162,477 B2    4/2012   Carimalo et al.
8,807,747 B2    8/2014   Guilloux et al.
(Continued)

FOREIGN PATENT DOCUMENTS

EP          857993 A2     8/1998
EP         1034453 B1     3/2003
(Continued)

OTHER PUBLICATIONS

English-language translation of Köppen: "Konzeption und Entwicklung von Gleitsichtgläsern," DOZ 10/95, pp. 42-46, discussed in paragraph [0170] of the specification as filed, 1995.

(Continued)

*Primary Examiner* — William R Alexander
*Assistant Examiner* — Henry A Duong
(74) *Attorney, Agent, or Firm* — Ewers & Hasselmann PLLC

(57) ABSTRACT

A progressive spectacle lens includes an upper viewing zone with a distance reference point providing a first refractive power, in particular a first mean refractive power, adapted to distance vision; a lower viewing zone with a near reference point providing a second refractive power, in particular the second mean refractive power, adapted to near vision, the second refractive power, in particular the second mean refractive power, representing an addition power relative to the first refractive power, in particular the first mean refractive power; a corridor between the upper viewing zone and the lower viewing zone in which the refractive power gradually changes from the first refractive power, in particular the first mean refractive power, to the second refractive power, in particular the second mean refractive power; and a left peripheral zone and a right peripheral zone, which are separated by the corridor and the lower viewing zone.

26 Claims, 15 Drawing Sheets

(58) Field of Classification Search
USPC .................................................. 351/159.42
See application file for complete search history.

(56) References Cited

U.S. PATENT DOCUMENTS

| | | | |
|---|---|---|---|
| 8,833,936 | B2 | 9/2014 | Varnas |
| 2012/0257161 | A1* | 10/2012 | Varnas .................. G02C 7/061 351/159.42 |
| 2015/0331255 | A1* | 11/2015 | Sankaridurg ........... G02C 7/043 351/159.06 |
| 2018/0157062 | A1* | 6/2018 | Asami ..................... G02C 7/06 |

FOREIGN PATENT DOCUMENTS

| | | |
|---|---|---|
| EP | 2069854 B1 | 4/2015 |
| WO | 9726579 A1 | 7/1997 |
| WO | 2011054058 A1 | 5/2011 |
| WO | 2018156402 A1 | 8/2018 |

OTHER PUBLICATIONS

Edwards et al.: "The Hong Kong Progressive Lens Myopia Control Study: Study Design and Main Findings," Investigative Ophthalmology & Visual Science, vol. 43, No. 9, pp. 2852 to 2858, Sep. 2002.

Gwiazda etal.: "A Randomized Clinical Trial of Progressive Addition Lenses versus Single Vision Lenses on the Progression of Myopia in Children," Investigative Ophthalmology & Visual Science, vol. 44, No. 4, pp. 1492 to 1500, Apr. 2003.

Charman et al.: "Peripheral refraction and the development of refractive error: a review," Ophthal. Physiol. Opt. 2010, 30, pp. 321 to 338, 2010.

Jung et al.: "Prevalence of Myopia and its Association with Body Stature and Educational Level in 19-Year-Old Male Conscripts in Seoul, South Korea," Investigative Ophthalmology & Visual Science, vol. 53, No. 9, pp. 5579 to 5583, Aug. 2012.

Hasebe et al.: "Myopia Control With Positively Aspherized Progressive Addition Lenses: A 2-Year, Multicenter, Randomized, Controlled Trial," Investigative Ophthalmology & Visual Science 2014; 55, pp. 7177 to 7188, 2014.

Wong et al.: "Epidemiology and Disease Burden of Pathologic Myopia and Myopic Choroidal Neovascularization: An Evidence-Based Systematic Review," Am. J. Ophthalmol. 2014;157, pp. 9 to 25, 2014.

Holden et al.: "Global Prevalence of Myopia and High Myopia and Temporal Trends from 2000 through 2050," Ophthalmology 2016;123, pp. 1036 to 1042, 2016.

Ophthalmic optics—Spectacle lenses—Vocabulary (ISO 13666:2012); German and English version EN ISO 13666:2012, Oct. 2013.

International Search Report issued in PCT/EP2017/080886, to which this application claims priority, dated Jun. 4, 2018.

International Preliminary Examination Report issued in PCT/EP2017/080886, to which this application claims priority, completed Nov. 14, 2018.

* cited by examiner

PROGRESSIVE SPECTACLE LENS, METHOD OF MANUFACTURING A PROGRESSIVE SPECTACLE LENS, AND METHOD OF DESIGNING A PROGRESSIVE SPECTACLE LENS

CROSS REFERENCE TO RELATED APPLICATIONS

This application is a continuation application of international patent application PCT/EP2017/080886, filed Nov. 29, 2017, which claims priority to European patent applications EP 16002581.3, filed Dec. 1, 2016, and EP 17179412.6, filed Jul. 3, 2017, all of which are hereby incorporated by reference in their entireties.

TECHNICAL FIELD

The present disclosure relates to a progressive a progressive spectacle lens for myopia control. In addition, the disclosure relates to methods of manufacturing and computer implemented methods of designing progressive spectacle lenses.

BACKGROUND

To provide focused vision, an eye must be capable of focusing light on the retina. The ability of an eye to focus light on the retina depends to a large extent on the shape of the eyeball. If an eyeball is too long relative to the focal length on the visual axis of the eye, an image of a distant object will form in front of the retina, a condition that is called myopia. As a consequence, such an eye, which is called myopic eye, will have difficulties of focusing distant objects on the retina.

Usually, glasses with diverging lenses to enlarge the focal length, so that the image of a distant object will form on the retina, are used for correcting myopia.

In many East Asian countries myopia has reached epidemic proportions, with some large urban centers reporting close to 100% incidence of myopia among 18 to 19 year olds (Jung S.-K. et al., Prevalence of myopia and its association with the body stature and educational level in 19-year-old male conscripts in Seoul, South Korea," Invest. Ophthalmol. Vis. Sci. 2012, 53, pp. 5579 to 5583). It has been estimated that there have been around 2 billion myopes worldwide in 2010 and some of the recent epidemiological modeling suggests that this number will increase to 5 billion by 2050 (Holden B. A. et al., "Global Prevalence of Myopia and High Myopia and Temporal Trends from 2000 through 2050," Ophthalmology, May 2016, 123(5), pp. 1036 to 1042). Furthermore, there is an increasing trend for juveniles to develop high myopia (defined as SER≤−5.00 D, where SER stands for spherical equivalent refraction), which substantially increases the risk of eye diseases like cataract, glaucoma, retinal detachment, and myopic maculopathy, all of which can cause irreversible vision loss (Wong T. Y. et al., "Epidemiology and disease burden of pathologic myopia and myopic choroidal neovascularization: an evidence-based systematic review," Am J Ophthalmol. 2014, 157, pp 9-25). Epidemiological models predict a global increase of high myopia from around 300 million in 2010 to 1 billion by 2050 (See, Holden B. A. et al.). This will inevitably lead to a very high cost to society for treating visual impairment and lost productivity.

Bi-focal and progressive lenses have been trialled clinically with the aim of reducing accommodative lag during near vision tasks which is thought to be one of the main causes of juvenile myopia progression that usually coincides with the beginning of schooling. Some of these trials have shown no effect (e.g., Edwards M. H. et al., "The Hong Kong progressive lens myopia control study: study design and main findings," Invest. Ophthalmol. Vis. Sci. 2002, 43, pp. 2852 to 2858), while others have indicated a significant retardation of myopia in the first year with saturation in longer term trials (e.g., Gwiazda J et al., "A randomized clinical trial of progressive addition lenses versus single vision lenses on the progression of myopia in children," Invest. Ophthalmol. Vis. Sci. 2003, 44, pp. 1492 to 1500, Hasebe S. et al., "Myopia control with positively aspherized progressive addition lenses: a 2-year, multicenter randomized, controlled trial," Invest. Ophthalmol. Vis. Sci. 2014, 55, pp. 7177 to 7188). The saturation issue may be due to some sort of adaptation of visual behaviour to avoid using the addition power or the adaptation of the accommodative system to the presence of the addition power, which leads to the relaxation of the accommodative effort. There is a need to improve progressive-addition lens (PAL) designs to provide a more effective reduction of the accommodative lag and possibly help overcome the saturation of their efficacy to control progression of myopia.

A progressive spectacle lens is usually formed by providing a semi-finished piece of preformed material for the making of a lens, i.e., a semi-finished lens blank. The semi-finished lens blank has a finished lens surface with a specific surface curvature on the front or the back surface and with the other surface not being finished yet. On the surface not finished yet, a free-form surface is formed. In this context, the term "free-form surface" means a surface that may be constructed by the use of piecewise-defined functions such as, e.g., splines and typically shows no point symmetry or axial symmetry. By forming the free-form surface, the progressive spectacle lens is provided with an upper viewing zone, i.e., a portion having a first refractive power for distance vision, a lower viewing zone, i.e., a portion having a second refractive power for near vision, and a corridor, i.e., a portion of providing clear vision for ranges of refractive power between the first and the second refractive power. However, it is also conceivable that a raw element, i.e., an element without any finished lens surface is used for forming the progressive spectacle lens. Throughout the present specification, the term "lens blank" shall encompass the semi-finished lens blank as well as the raw lens.

U.S. Pat. No. 8,162,477 B2 discloses a progressive ophthalmic spectacle lens for myopia correction. This progressive ophthalmic spectacle lens comprises an upper area in which the correction is adapted for peripheral vision of the wearer.

EP 2 069 854 B1 describes a progressive ophthalmic spectacle lens in which the mean addition power throughout the peripheral region is positive and at all radial extents greater that 20 mm from the geometric center of the progressive ophthalmic spectacle lens, is in the range of 0.50 D to 3.00 D.

EP 1 034 453 B1 describes a progressive ophthalmic spectacle lens with a length of the intermediate corridor of 15 mm or less.

U.S. Pat. No. 8,807,747 B2 describes a spectacle eyeglass of the progressive addition type having been designed for myopic children. To this purpose, an ergorama has been constructed, taking into account vision conditions encountered by the children in their everyday life. In particular, the eyeglass has a limited optical power increase between two reference eye directions, a start of the optical power increase which is located quite low in the eyeglass, and an offset value for a meridian line which is higher than that of eyeglasses designed for adults.

U.S. Pat. No. 8,833,936 B2 describes a progressive spectacle lens including an upper viewing zone, a lower viewing zone, a corridor, and a peripheral region disposed on each side of the lower viewing zone. The upper viewing zone includes a distance reference point and a fitting cross, and provides a first refractive power for distance vision. The lower viewing zone, which is for near vision, provides an addition power relative to the first refractive power. The corridor connects the upper and lower zones and provides a refractive power varying from that of the upper viewing zone to that of the lower viewing zone. Each peripheral region includes a zone of positive power relative to the addition power which provides therein a positive refractive power relative to the refractive power of the lower viewing zone. The zones of relative positive power are disposed immediately adjacent to the lower viewing zone, such that the lower viewing zone interposes the zones of relative positive power.

Most of the conventional progressive spectacle lenses currently on the market try to ensure a fairly wide near vision zone with a smooth distribution (smooth gradients) of mean addition power in the lower portion of the spectacle lens, minimizing the size and depth of the peripheral power depressions on both sides of the near vision zone.

WO 97/26579 A1 describes a method of defining a composite progressive power surface by a superposition of a soft and a hard design. WO 97/26579 A1 shows hard designs and a composite design with areas in the distance viewing zone, the left peripheral zone and the right peripheral zone in which the mean power does not exceed 0.130 D.

WO 2011/054058 A1 describes a progressive ophthalmic spectacle lens for correcting myopia. The progressive ophthalmic spectacle lens includes peripheral zones in which peaks with a mean addition power higher than the addition power at the near reference point are located immediately adjacent to the near portion of the progressive ophthalmic spectacle lens. These peaks are laterally separated by at least 20 mm. Further out, the mean addition power may drop steeply to very low values and may even become negative.

SUMMARY

It is an objective of the present disclosure to provide a progressive spectacle lens for myopia control that allows a more effective myopia control through an elimination or at least greater reduction of the accommodative lag during near vision tasks. It is a further objective of the present disclosure to provide an advantageous method of manufacturing a progressive spectacle lens and an advantageous method of designing progressive spectacle lenses.

The first objective is achieved by a progressive spectacle lens, as disclosed herein, and the second objective by a method of designing a progressive spectacle lens, as disclosed herein, and the third objective is achieved by a computer implemented method of designing a progressive spectacle lens as disclosed herein.

Before turning to the present disclosure, an explanation of some expressions used throughout the specification will be given below.

A "toroidal surface" is a surface having mutually perpendicular principal meridians of unequal curvature, of which the cross-section in both principal meridians is nominally circular.

The term "spectacle lens" includes all forms of individual refractive optical bodies employed in the ophthalmic arts, including, but not limited to, spectacle lenses in a spectacle frame, spectacle lenses adapted to a specific spectacle frame, or spectacle lenses before glazing.

The term "fitting point" designates that point on the front surface of a lens or semi-finished lens blank stipulated by the manufacturer as a reference point for positioning the lens in front of the eye.

The term "line of sight" refers to a line joining the center of the fovea to the center of the exit pupil of the eye, and its continuation from the center of the entrance pupil forward into object space The term "primary position" stands for the position of the eye relative to the head, looking straight ahead at an object at eye level.

The term "pantoscopic angle" refers to an angle in the vertical plane between the normal to the front surface of the spectacle lens at its boxed center, i.e., at the intersection of the horizontal and vertical centerlines, and the line of sight of the eye in the primary position, usually taken to be the horizontal (see sec. 6.18 of DIN EN ISO 13666:2013-10).

The term "wrap angle or face form angle" refers to the angle between the plane of the spectacle front and the plane of the right lens shape, or of the left lens shape (see sec. 17.3 of DIN EN ISO 13666:2013-10). The right or left face form angle is regarded as positive if the temporal side of the right or left lens plane is closer to the head than the plane of the spectacle front. The right and left face form angles may differ, but in practice, the face form angle is often measured and specified as the average of the right and left face form angles.

The term "as-worn position" refers to the position and orientation of the spectacles relative to the eyes and face during wear and includes at least values for distance between the center of rotation of the eye and the back vertex point of the lens, the wrap angle and the pantoscopic angle. In the present disclosure, an as-worn position is given by a combination of a specific value for distance between the center of rotation of the eye and the back vertex point of the lens, a specific value for the wrap angle, and a specific value for the pantoscopic angle, where the specific value for the distance between the center of rotation of the eye and the back vertex point of the lens may be a value taken from the range between 20 mm and 30 mm, the specific value for the wrap angle may be a value taken from the range between −5 degree and +15 degree and the specific value for the pantoscopic angle may be a value taken from the range between −20 degree to +30 degree.

According to a first aspect of the present disclosure, an inventive progressive spectacle lens, which may individually be adapted to a specific as-worn position for a wearer, includes an upper viewing zone, a lower viewing zone, a corridor between the upper viewing zone and the lower viewing zone, and left and right peripheral zones. The left peripheral zone and the right peripheral zone are separated by the lower viewing zone and the corridor. The specific as-worn position may either be an individual as-worn position, i.e., an as-worn position obtained for an individual wearer or a default as-worn position, which is an average as-worn position for a specific population of wearers. The default as-worn positions may vary in different markets, e.g., the default values of pantoscopic angle and wrap angle may be different in Asia from those in Europe, due to the differences in the physical characteristics of Asian and Caucasian faces.

The upper viewing zone includes a distance reference point providing in the specific as-worn position a first refractive power, in particular a first mean refractive power, adapted to distance vision, called distance refractive power in the following. The lower viewing zone comprises a near reference point providing in the specific as-worn position a second refractive power, in particular a mean second refractive power, adapted to near vision. The second refractive power, in particular the second mean refractive power, called near refractive power in the following, represents an addition power relative to the first refractive power, in particular the first mean refractive power (or distance refractive power), i.e., the difference between the second refractive power, in particular the second mean refractive power, and the first refractive power, in particular the first mean refractive power, is the addition power. In the corridor between the upper viewing zone and the lower viewing zone the refractive power gradually changes in the specific as-worn position from the distance refractive power to the near refractive power, i.e., the addition power changes from 0 to the addition power providing the near refractive power.

According to the disclosure, low mean power zones are present in the upper viewing zone, the left peripheral zone, and the right peripheral zone. The distance, typically the horizontal distance, between the low mean power zone in the left peripheral zone and the low mean power zone in the right peripheral zone is typically no larger than 25 mm, and in some exemplary embodiments of the disclosure typically no larger than 20 mm. The distance between the low mean power zone in the left peripheral zone and the low mean power zone in the right peripheral zone is the minimum distance between an 0.125 contour in the left peripheral zone and an 0.125 contour in the right peripheral zone, i.e., the length of the shortest straight line which can be drawn between the 0.125 D-contour in the left peripheral zone and the 0.125 D-contour in the right peripheral zone. The horizontal distance between the low mean power zone in the left peripheral zone and the low mean power zone in the right peripheral zone is the minimum horizontal distance between an 0.125 contour in the left peripheral zone and an 0.125 contour in the right peripheral zone, i.e., the length of the shortest straight horizontal line that can be drawn between the 0.125 D-contour in the left peripheral zone and the 0.125 D-contour in the right peripheral zone. The horizontal direction can be determined on the basis of the engravings present on a surface or in the bulk of a progressive spectacle lens. In the low power zones, the mean refractive power does not exceed the first refractive power, in particular the first mean refractive power, plus 0.125 D. In addition, the low mean power zones occupy at least 40%, typically at least 45%, of the ophthalmic spectacle lens. If the ophthalmic spectacle lens is a round ophthalmic spectacle lens before gazing which has a diameter of at last 40 mm the low mean power zones occupy at least 40% of an area of the spectacle lens, which lies within a diameter of 40 mm around the geometric center of the spectacle lens. In the context of the present specification, the expression "area of the spectacle lens" refers to an area on one of the front and the rear surface of the spectacle lens.

Typically, the low mean power zones in the left peripheral zone and in the right peripheral zone occupy at least 10%, typically at least 15%, even more typically at least 25%, of the area of the spectacle lens.

Typically, the mean refractive power experienced by a wearer in the left peripheral zone and the right peripheral zone is always below the second refractive power, in particular the second mean refractive power.

The addition power provided by the second refractive power, in particular the second mean refractive power, relative to the first refractive power, in particular the first mean refractive power, of the inventive spectacle lens may lie in the range of 1.0 D to 3.0 D and, in particular, in the range of 1.5 D to 2.5 D.

A progressive ophthalmic spectacle lens according to an exemplary embodiment of the present disclosure includes a front surface (that is, the surface farthest from the eye) and a back surface (that is, the surface nearest to the eye). The front and/or back surfaces may be shaped to provide suitable contours of refracting power and astigmatism for the upper viewing zone, the lower viewing zone and the corridor.

The front surface and the back surface of the lens may have any suitable shape. In an exemplary embodiment, the front surface is a free-form surface and the rear surface is spherical or toric. In another exemplary embodiment, the front surface is a spherical or a toric surface and the rear surface is a free-form surface.

In yet another exemplary embodiment, both the front and rear surfaces are free-form surfaces. It will be appreciated that a free-form surface may include, for example, an atoric surface, a progressive surface, or combinations thereof.

This disclosure overcomes the issues mentioned in the background section by modifying the size of stable power in the addition zone and by manipulating the peripheral lateral power gradients of this zone. It is hypothesized that these changes to the progressive spectacle lens will stimulate additional accommodative effort and will inhibit its relaxation with time because the presence of the plus power in the lower vision zone will be less obvious to the wearer due to the smaller spatial area covered by the plus power. Furthermore, the negative power gradients on both sides of the near vision zone should help increase the accommodative effort, if these peripheral cues to accommodation are strong enough (Charman W. N. et al., Peripheral refraction and the development of refractive error: a review, Ophthalmic Physiol Opt 2010, 30, 321-338).

Based on the hypothesis described above, the inventive progressive ophthalmic spectacle lens has been developed to provide a new and effective myopia control. The ideal effect of this progressive lens would be for the lens not to alter the accommodative response of a child relative to the usual response the eye exhibits with a single vision lens (distance prescription) during near vision tasks, but to create an image in front of or on the fovea, or at least to minimize the accommodative lag on the fovea. In contrast thereto, in a standard progressive addition lenses (PAL) the wearer usually sees a large area of plus power in the lower portion of the lens, which may lead to the adjustment (a lowering) of the accommodation response.

With the inventive progressive spectacle lens, the near vision zone of the corresponding myopia control PAL can be made narrower than usual and can be surrounded laterally with a relatively low mean power similar to the distance power of the lens. Hence, the near vision zone can be made as narrow as practical while the peripheral power depressions on both sides of the near vision zone can be made as wide as possible. This means that there are relatively steep gradients left and right to the near vision zone. In contrast thereto, conventional PALs currently on the market try to ensure a fairly wide near vision zone with a smooth distribution (smooth gradients) of added mean power in the lower portion of the lens minimizing the size and depth of the peripheral power depressions on both sides of the near vision zone.

In the inventive progressive spectacle lens, the low mean power zones in the left and right peripheral zones typically extend to a location below a horizontal line running through the near reference point to sufficiently surround the lower viewing zone on the left and on the right. As mentioned earlier, the horizontal direction can be determined on the basis of the engravings present on a surface of a progressive spectacle lens. In particular, low mean power zones in the left and right peripheral zones which extend at least to horizontal lines located 5 mm above and below a horizontal line running through the near reference point of the spectacle lens are typical. By this measure, most of the lower viewing zone is laterally surrounded by the low power zones.

In the present disclosure, the low mean power zone in the upper viewing zone may cover all the spectacle lens area (within the 40 mm diameter circle around the geometric center of the spectacle lens), which lies above a horizontal line running through the distance reference point.

In some exemplary embodiments of the disclosure, e.g. in an exemplary embodiment in which the second refractive power, in particular the second mean refractive power, represents an addition power up to 1.5 D (diopter) or less to the first refractive power, particularly the first mean refractive power, the low mean power zone in the upper viewing zone, the low mean power zone in the left peripheral zone and the low mean power zone in the right peripheral zone may form a contiguous low power zone. This measure provides a particularly large low power zone. In particular, such a large low mean power zone may occupy at least 50% and typically at least 60% of the area of the spectacle lens within the 40 mm diameter circle around the geometric center of the spectacle lens.

In an exemplary embodiment of the progressive spectacle lens, the second refractive power, in particular the second mean refractive power, represents an addition power in the range of 1.5 D and up to 2.0 D. In this exemplary embodiment, the low mean power zones in the left and right peripheral zones are separated from the low mean power zone in the upper viewing zone. Areas in which the mean addition power is more than 0.125 D above the distance power, but does not reach 0.5 D above the distance power, connect the low mean power zone in the upper viewing zone with each of the low mean power zones in the left and right peripheral zones. In this exemplary embodiment, the low mean power zone may occupy at least 45% of the area of the spectacle lens within the 40 mm diameter circle around the geometric center of the spectacle lens.

In another exemplary embodiment of the progressive spectacle lens, the second refractive power, in particular the second mean refractive power, represents an addition power in the range of 2.0 D and up to 2.5 D and the low mean power zones in the left and right peripheral zones are separated from the low mean power zone in the upper viewing zone. An area in which the mean addition is more than 0.125 D above the distance power, but does not reach 0.5 D above the distance power, connects the low mean power zone in the upper viewing zone with at least one of the low mean power zones in the left and right peripheral zones. In this exemplary embodiment the low mean power zone may occupy at least 45% of the area of the spectacle lens, in particular of within the 40 mm diameter circle around the geometric center of the spectacle lens if the spectacle lens is a round spectacle lens with a diameter of at least 40 mm.

Typically, the surface astigmatism of the progressive spectacle lens, in particular of within the 40 mm diameter circle around the geometric center of the spectacle lens if the spectacle lens is a round spectacle lens with a diameter of at least 40 mm, does not exceed 5.5 D in order to keep aberrations in the peripheral zone as low as possible. If the addition power is in the range of more than 1.5 D and up to 2.0 D the surface astigmatism, in particular of within the 40 mm diameter circle around the geometric center of the spectacle lens if the spectacle lens is a round spectacle lens with a diameter of at least 40 mm, typically does not exceed 4.5 D, and if the addition power is 1.5 D or less, the surface astigmatism inside the 40 mm diameter typically does not exceed 3.5 D.

The inventive method of manufacturing a progressive spectacle lens, which is adapted to a specific wearer with an specific as-worn position, comprises the steps of:
  obtaining or providing the specific as-worn position for the wearer,
  obtaining or providing a refractive power for distance vision of the wearer,
  obtaining or providing refractive power for near vision of the wearer, and
  providing a lens blank,
based on the specific as-worn position for the wearer, the power for distance vision and the power for near vision, forming at least one free-form surface on the front surface and/or the rear surface of the lens blank which defines an upper viewing zone with a distance reference point providing in the specific as-worn position a first refractive power, in particular a first mean refractive power, a lower viewing zone with a near reference point providing in the specific as-worn position a second refractive power, in particular a second mean refractive power, a corridor between the upper viewing zone and the lower viewing zone, a left peripheral zone and a right peripheral zone which are separated by the corridor and the lower viewing zone, where the free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular a first mean refractive power, plus 0.125 D in the low mean power zones, and where the at least one free-form surface is formed such that the low mean power zones occupy at least 40% of the area of the progressive spectacle lens. Typically, the mean refractive power experienced by a wearer in the left peripheral zone and the right peripheral zone is always below the second refractive power, in particular the second mean refractive power. The spectacle lens that is manufactured by the inventive method may be a round spectacle lens before glazing, which has a diameter of at last 40 mm. In this case the low mean power zones occupy at least 40% of an area which lies within the diameter of 40 mm. In particular, the low mean power zone in the upper viewing zone may cover all the spectacle lens area within the diameter of 40 mm around the geometric center of the spectacle lens which lies above a horizontal line running through the distance reference point. Forming the at least one free-form surface on the front surface and/or the rear surface of the lens blank may include an optimization process in which the shape of the free-form surface of a lens blank is optimized. The optimization process is based on a target lens design which defines surface properties and/or optical properties to be achieved with the optimized free-form surface. In the optimization process, the free-for surface is optimized by minimizing the difference between the surface properties and/or optical properties achieved with the free-form surface and surface properties and/or optical properties defined by the target lens design. The target lens design is chosen such that the free-form surface resulting from the optimization process has a shape which results in the low mean power zones occupying at least 40% of the area of the progressive spectacle lens.

A computer implemented method of designing a progressive spectacle lens which is adapted to a specific wearer with specific as-worn, which comprises the steps of:
obtaining or providing the specific as-worn position for the wearer,
obtaining or providing a refractive power for distance vision of the wearer,
obtaining or providing a refractive power for near vision of the wearer, based on the specific as-worn position for the wearer, the refractive power for distance vision and the refractive power for near vision, providing a target lens design defining optical properties to be achieved by the progressive spectacle lens, and
optimizing of a free-form surface to be formed on a lens blank such as to minimize the difference between the optical properties achieved with the free-form surface and the optical properties defined by the target lens design.

The target lens design is chosen such that the optimization provides at least one optimized free-form surface for a front surface and/or a rear surface of a lens blank, which at least one optimized free-form surface defines an upper viewing zone with a distance reference point providing in the specific as-worn position a first refractive power, in particular a first mean refractive power, a lower viewing zone with a near reference point providing in the specific as-worn position a second refractive power, in particular a second mean refractive power, a corridor between the upper viewing zone and the lower viewing zone, a left peripheral zone and a right peripheral zone which are separated by the corridor and the lower viewing zone. In addition, the optimized free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular the first mean refractive power, plus 0.125 D in the low mean power zones. Furthermore, the target lens design is chosen such that after the optimization of the at least one free-form surface the low mean power zones occupy at least 40% of the area of the progressive spectacle lens.

In particular, the target lens design may be chosen such that in the at least one free-form surface provided by the optimization the distance between the low mean power zone in the left peripheral zone and the low mean power zone the right peripheral zone is no larger than 25 mm and, in some exemplary embodiments, no larger than 20 mm.

Moreover, the target lens design may be chosen such that in the at least one free-form surface provided by the optimization, the low mean power zone in the upper viewing zone, the low mean power zone in the left peripheral zone, and the low mean power zone in the right peripheral zone form a contiguous low power zone.

In particular, the target lens design may be chosen such that in the at least one free-form surface provided by the optimization, the addition power provided by the second refractive power, in particular the second mean refractive power, relative to the first refractive power, particularly the first mean refractive power, lies in the range of 1.0 D to 3.0 D.

The target lens design may be chosen such that in the at least one free-form surface provided by the optimization, the low mean power zones in the left and right peripheral zones extend to a location below a horizontal line running through the near reference point. In particular, the target lens design may be chosen such that in the at least one free-form surface provided by the optimization, the low mean power zones in the left and right peripheral zones extend at least to horizontal lines located 5 mm above and below a horizontal line running through the near reference point.

In a first variant of the described method of designing a progressive spectacle lens, the target lens design is chosen such that in the at least one free-form surface provided by the optimization, the low mean power zone in the upper viewing zone, the low mean power zone in the left peripheral zone, and low mean power zone in the right peripheral zone form a contiguous low power zone. In this case, the second refractive power, in particular the second mean refractive power, may represent an addition power of 1.5 D or less to the first refractive power, particularly the first mean refractive power. Moreover, the target lens design is chosen such that in the at least one free-form surface provided by the optimization, the contiguous low mean power zone occupies at least 50% of the area of the spectacle lens that lies within a diameter of 40 mm around the geometric center of the spectacle lens.

In a second variant of the inventive method of designing a progressive spectacle lens, the target lens design is chosen such that in the at least one free-form surface provided by the optimization, the second refractive power, in particular the second mean refractive power, represents an addition power of more than 1.5 D and up to 2.0 D to the first refractive power, in particular the first mean refractive power, and the low mean power zones in the left and right peripheral zones are separated from the low mean power zone in the upper viewing zone, where areas in which the mean refractive power is more than the first refractive power, particularly the first mean refractive power plus 0.125 D, but does not exceed the first refractive power, in particular the first mean refractive power plus 0.5 D, connect the low mean power zone in the upper viewing zone with each of the low mean power zones in the left and right peripheral zones.

In a third variant of the inventive method of designing a progressive spectacle lens the target lens design is chosen such that in the at least one free-form surface provided by the optimization the second refractive power, in particular the second mean refractive power, represents an addition power of more than 2.0 D and up to 2.5 D to the first refractive power, in particular the first mean refractive power, and the low mean power zones in the left and right peripheral zones are separated from the low mean power zone in the upper viewing zone, where an area in which the mean refractive power is more than the first refractive power, in particular the first mean refractive power plus 0.125 D, but does not exceed the first refractive power, in particular the first mean refractive power plus 0.5 D, connects the low mean power zone in the upper viewing zone with at least one of the low mean power zones in the left and right peripheral zones.

The target lens design may be chosen such that in the at least one free-form surface provided by the optimization, the surface astigmatism inside the 40 mm diameter of the lens does not exceed 5.5 D.

The computer implemented method may further comprise the steps of providing a lens blank and forming a progressive spectacle lens with the optimized free-form surface out of the lens blank.

The inventive method allows designing and manufacturing an inventive progressive spectacle lens with the advantages mentioned above with respect to the inventive progressive spectacle lens. Therefore, with respect to the advantages of the inventive method it is referred to the advantages mentioned with respect to the inventive progressive spectacle lens.

In addition, the disclosure provides another computer implemented method of designing a progressive spectacle lens, which is adapted to a wearer with an specific as-worn position, the spectacle lens having a front surface and a back surface. This method comprises the steps of:

- obtaining or providing the specific as-worn position for the wearer,
- obtaining or providing a first refractive power, in particular a first mean refractive power, for distance vision of the wearer,
- obtaining or providing a second refractive power, in particular the second mean refractive power, for near vision of the wearer,
- providing a target lens design defining a refractive power distribution of the progressive spectacle lens, comprising:
  - the first refractive power, in particular the first mean refractive power, for distance vision and the second refractive power, in particular the second mean refractive power, for near vision,
  - an upper viewing zone with a distance reference point providing a first refractive power, in particular a first mean refractive power, adapted to distance vision;
  - a lower viewing zone with a near reference point providing a second refractive power, in particular a second mean refractive power, adapted to near vision, the second refractive power, in particular the second mean refractive power, providing an addition power relative to the first refractive power, in particular the first mean refractive power;
  - a corridor between the upper viewing zone and the lower viewing zone in which the refractive power gradually changes from the first refractive power, in particular the first mean refractive power, to the second refractive power, in particular the second mean refractive power; and
  - a left peripheral zone and a right peripheral zone which are separated by the corridor and the lower viewing zone;
  - low mean power zones are present in the upper viewing zone, the left peripheral zone and the right peripheral zone where the mean refractive power the wearer experiences in the specific as-worn position does not exceed the first refractive power, in particular the first mean refractive power, plus 0.125 D in the low mean power zones;
  - wherein the low mean power zones occupy at least 40% of the area of the spectacle lens, and
- optimizing the shape of at least one of the front surface or the back surface in the specific as-worn position based on the target lens design.

According to another aspect of the disclosure, a progressive spectacle lens is provided which includes:

- an upper viewing zone with a distance reference point providing in the specific as-worn position a first refractive power, in particular a first mean refractive power, adapted to distance vision;
- a lower viewing zone with a near reference point providing in the specific as-worn position a second refractive power, in particular a second mean refractive power, adapted to near vision, the second refractive power, in particular the second mean refractive power, representing an addition power relative to the first refractive power, in particular the first mean refractive power;
- a corridor between the upper viewing zone and the lower viewing zone in which the refractive power gradually changes from the first refractive power, in particular the first mean refractive power, to the second refractive power, in particular the second mean refractive power, in the specific as-worn position;
- a left peripheral zone and a right peripheral zone which are separated by the corridor and the lower viewing zone; and
- low mean power zones in the upper viewing zone, the left peripheral zone and the right peripheral zone where the mean refractive power the wearer experiences in the specific as-worn position does not exceed the first refractive power, in particular the first mean refractive power, plus 0.125 D in the low mean power zones.

According to the present aspect of the disclosure, the low mean power zones occupy at least 40% of the area of the spectacle lens, and the distance, in particular the horizontal distance, between the low mean power zone in the left peripheral zone and the low mean power zone in the right peripheral zone is no larger than 25 mm. The progressive spectacle lens according to the present aspect of the disclosure may be a round progressive spectacle lens, which has a diameter of at least 40 mm. In this case, the low mean power zones occupy at least 40% of the area of the progressive spectacle lens, which lies within a diameter of 40 mm around the geometric center of the progressive spectacle lens.

In addition, according to this aspect of the disclosure, a computer implemented method of designing a progressive spectacle lens that is adapted to a specific wearer in a specific as-worn position, is provided. The method comprises the steps of:

- obtaining or providing the specific as-worn position for the wearer,
- obtaining or providing a refractive power for distance vision of the wearer,
- obtaining or providing a refractive power for near vision of the wearer, based on the specific as-worn position for the wearer, the refractive power for distance vision and the refractive power for near vision, providing a target lens design defining surface properties or optical properties to be achieved by the progressive spectacle lens, and

- optimizing a free-form surface to be formed on a lens blank such as to minimize the difference between the surface properties of the free-form surface or the optical properties achieved with the free-form surface and the surface properties or the optical properties defined by the target lens design respectively.

The target lens design is chosen such that the optimization provides at least one optimized free-form surface for a front surface and/or a rear surface of the lens blank which at least one optimized free-form surface defines an upper viewing zone with a distance reference point providing in the specific as-worn position a first refractive power, in particular a first mean refractive power, a lower viewing zone with a near reference point providing in the specific as-worn position the second refractive power, in particular the second mean refractive power, a corridor between the upper viewing zone and the lower viewing zone, and a left peripheral zone and a right peripheral zone which are separated by the corridor and the lower viewing zone. In addition, the target lens design is chosen such that the optimized free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular the first mean refractive power, plus 0.125 D in the low mean power zones. Furthermore, the target lens design is chosen such that after the optimization of the at least one free-form surface the low mean power zones occupy at least 40% of the area of the progressive spectacle lens and that the distance, in particular the horizontal distance, between the low mean power zone in the left peripheral zone and the low mean power zone in the right peripheral zone is no larger than 25 mm.

According to the present aspect of the disclosure, the progressive spectacle lens may be a round progressive spectacle lens which has a diameter of at least 40 mm. In this case, the target lens design is chosen such that the low mean power zones occupy at least 40% of the area of the progressive spectacle lens which lies within a diameter of 40 mm around the geometric center of the progressive spectacle lens.

In the inventive progressive spectacle lens according to the present aspect of the disclosure, the near vision zone of a myopia control progressive addition lens (PAL) element is narrower than usual and is surrounded laterally with a relatively low mean power similar to the distance power of the lens. Hence, the near vision zone is as narrow as practical, while the peripheral power depressions on both sides of the near vision zone are as wide as possible. This means that there are relatively steep gradients left and right to the near vision zone. In contrast thereto, conventional PALs currently on the market try to ensure a fairly wide near vision zone with a smooth distribution (smooth gradients) of added mean power in the lower portion of the lens minimizing the size and depth of the peripheral power depressions on both sides of the near vision zone.

According to still another aspect of the disclosure, a progressive spectacle lens is provided which includes:
- an upper viewing zone with a distance reference point providing in the specific as-worn position a first refractive power, in particular a first mean refractive power, adapted to distance vision;
- a lower viewing zone with a near reference point providing in the specific as-worn position a second refractive power, in particular a second mean refractive power, adapted to near vision, the second refractive power, in particular the second mean refractive power, representing an addition power relative to the first refractive power, in particular the first mean refractive power;
- a corridor between the upper viewing zone and the lower viewing zone in which the refractive power gradually changes from the first refractive power, in particular the first mean refractive power, to the second refractive power, in particular the second mean refractive power, in the specific as-worn position;
- a left peripheral zone and a right peripheral zone which are separated by the corridor and the lower viewing zone; and
- low mean power zones in the upper viewing zone, the left peripheral zone and the right peripheral zone where the mean refractive power the wearer experiences in the specific as-worn position does not exceed the first refractive power, in particular the first mean refractive power plus 0.125 D, in the low mean power zones.

According to the present aspect of the disclosure, the progressive spectacle lens is a round progressive spectacle lens which has a diameter of at least 40 mm and the low mean power zones occupy at least 40% of the area of the progressive spectacle lens which lies within a diameter of 40 mm around the geometric center of the progressive spectacle lens.

In addition, according to the present aspect of the disclosure, a computer implemented method of designing a round progressive spectacle lens which is adapted to a specific wearer with a specific as-worn position is provided. The method comprises the steps of:
- obtaining or providing the specific as-worn position for the wearer,
- obtaining or providing a refractive power for distance vision of the wearer,
- obtaining or providing a refractive power for near vision of the wearer,
- based on the specific as-worn position for the wearer, the refractive power for distance vision and the refractive power for near vision,
  - providing a target lens design defining surface properties or optical properties to be achieved by the progressive spectacle lens, and
  - optimizing a free-form surface to be formed on a lens blank such as to minimize the difference between the surface properties of the free-form surface or the optical properties achieved with the free-form surface and the surface properties or the optical properties defined by the target lens design, respectively.

The target lens design is chosen such that the optimization provides at least one optimized free-form surface for a front surface and/or a rear surface of the lens blank which at least one optimized free-form surface defines an upper viewing zone with a distance reference point providing in the specific as-worn position a refractive power, in particular a first mean refractive power, a lower viewing zone with a near reference point providing in the specific as-worn position a second refractive power, in particular a second mean refractive power, a corridor between the upper viewing zone and the lower viewing zone, and a left peripheral zone and a right peripheral zone which are separated by the corridor and the lower viewing zone. In addition, the target lens design is chosen such that the optimized free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular the first mean refractive power plus 0.125 D, in the low mean power zones. Furthermore, the target lens design is chosen such that after the optimization of the at least one free-form surface, the low mean power zones occupy at least 40% of the area of the progressive spectacle lens which lies within a diameter of 40 mm around the geometric center of the round progressive spectacle lens.

According to still another aspect of the disclosure, a progressive spectacle lens is provided which includes:
- an upper viewing zone with a distance reference point providing in the specific as-worn position a first refractive power, in particular a first mean refractive power, adapted to distance vision;
- a lower viewing zone with a near reference point providing in the specific as-worn position a second refractive power, in particular a second mean refractive power, adapted to near vision, the second refractive power, in particular the second mean refractive power, representing an addition power relative to the first refractive power, in particular the first mean refractive power;

a corridor between the upper viewing zone and the lower viewing zone in which the refractive power gradually changes from the first refractive power, in particular the first mean refractive power, to the second refractive power, in particular the second mean refractive power, in the specific as-worn position;

a left peripheral zone and a right peripheral zone which are separated by the corridor and the lower viewing zone; and low mean power zones in the upper viewing zone, the left peripheral zone and the right peripheral zone where the mean refractive power the wearer experiences in the specific as-worn position does not exceed the first refractive power, in particular the first mean refractive power plus 0.125 D, in the low mean power zones.

According to the present aspect of the disclosure, the low mean power zones occupy at least 40% of the area of the progressive spectacle lens, and the low mean power zones in the left peripheral zones and in right peripheral zone occupy at least 10%, typically at least 15%, even more typically at least 25%, of the area of the progressive spectacle lens. The progressive spectacle lens according to the present aspect of the disclosure may be a round progressive spectacle lens which has a diameter of at least 40 mm. In this case, the low mean power zones occupy at least 40% of the area of the progressive spectacle lens which lies within a diameter of 40 mm around the geometric center of the progressive spectacle lens.

In addition, according to the present aspect of the disclosure, a computer implemented method of designing a round progressive spectacle lens which is adapted to a specific wearer in a specific as-worn position is provided. The method comprises the steps of:

obtaining or providing or deriving the specific as-worn position for the wearer, obtaining or providing a refractive power for distance vision of the wearer, obtaining or providing a refractive power for near vision of the wearer, based on the specific as-worn position for the wearer, the refractive power for distance vision and the refractive power for near vision, providing a target lens design defining surface properties or optical properties to be achieved by the progressive spectacle lens, and optimizing a free-form surface of to be formed on a lens blank such as to minimize the difference between the surface properties of the free-form surface or the optical properties achieved with the free-form surface and the surface properties or the optical properties defined by the target lens design, respectively.

The target lens design is chosen such that the optimization provides at least one optimized free-form surface for a front surface and/or a rear surface of the lens blank with at least one optimized free-form surface, defines an upper viewing zone with a distance reference point providing in the specific as-worn position a first refractive power, in particular a first mean refractive power, a lower viewing zone with a near reference point providing in the specific as-worn position a second refractive power, in particular a first mean refractive power, a corridor between the upper viewing zone and the lower viewing zone, and a left peripheral zone and a right peripheral zone, which are separated by the corridor and the lower viewing zone. In addition, the optimized free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular the first mean refractive power plus 0.125 D, in the low mean power zones. Furthermore, the target lens design is chosen such that after the optimization of the at least one free-form surface, the low mean power zones occupy at least 40% of the area of the progressive spectacle lens and the low mean power zones in the left peripheral zones and in right peripheral zone occupy at least 10%, typically at least 15%, even more typically at least 25%, of the area of the progressive spectacle lens.

According to the present aspect of the disclosure the progressive spectacle lens may be a round progressive spectacle lens which has a diameter of at least 40 mm. In this case, the target lens design is chosen such that the low mean power zones occupy at least 40% of the area of the progressive spectacle lens which lies within a diameter of 40 mm around the geometric center of the progressive spectacle lens.

According to still another aspect of the disclosure, a progressive spectacle lens is provided which includes:

an upper viewing zone with a distance reference point providing in the specific as-worn position a first refractive power, in particular a first mean refractive power, adapted to distance vision;

a lower viewing zone with a near reference point providing in the specific as-worn position a second refractive power, in particular a second mean refractive power, adapted to near vision, the second refractive power, in particular the second mean refractive power, representing an addition power relative to the first refractive power, in particular the first mean refractive power;

a corridor between the upper viewing zone and the lower viewing zone in which the refractive power gradually changes from the first refractive power, in particular the first mean refractive power, to the second refractive power, in particular the second mean refractive power, in the specific as-worn position;

a left peripheral zone and a right peripheral zone which are separated by the corridor and the lower viewing zone; and low mean power zones in the upper viewing zone, the left peripheral zone and the right peripheral zone where the mean refractive power the wearer experiences in the specific as-worn position does not exceed the first refractive power, in particular the first mean refractive power plus 0.125 D, in the low mean power zones;

According to the present aspect of the disclosure, the low mean power zones occupy at least 40% of the area of the progressive spectacle lens, and the low mean power zones occupy such an area of the left peripheral zone and/or the right peripheral zone that, in the specific as-worn position, the accommodative response of the wearer relative to the usual response that the eye exhibits with a single vision lens according to a distance prescription is not altered during near vision tasks but an image in front of or on the fovea is created, or at least the accommodative lag on the fovea is minimized.

The progressive spectacle lens according to the present aspect of the disclosure may be a round progressive spectacle lens which has a diameter of at least 40 mm. In this case, the low mean power zones occupy at least 40% of the area of the progressive spectacle lens which lies within a diameter of 40 mm around the geometric center of the progressive spectacle lens.

In addition, according to the present aspect of the disclosure, a computer implemented method of designing a round progressive spectacle lens which is adapted to a specific wearer with a specific as-worn position is provided. The method comprises the steps of:

obtaining or providing or deriving the specific as-worn position for the wearer, obtaining or providing or a refractive power for distance vision of the wearer, obtaining or providing a refractive power for near vision of the wearer, based on the specific as-worn position for the wearer, the refractive power for distance vision and the refractive power for near vision, providing a target lens design defining surface properties or optical properties to be achieved by the progressive spectacle lens, and optimizing a free-form surface to be formed on a lens blank such as to minimize the difference between the surface properties of the free-form surface or the optical properties achieved with the free-form surface and the surface properties or the optical properties defined by the target lens design, respectively.

The target lens design is chosen such that the optimization provides at least one optimized free-form surface for a front surface and/or a rear surface of the lens blank with at least one optimized free-form surface, defines an upper viewing zone with a distance reference point providing in the specific as-worn position a first refractive power, in particular a first mean refractive power, a lower viewing zone with a near reference point providing in the specific as-worn position a second refractive power, in particular a second mean refractive power, a corridor between the upper viewing zone and the lower viewing zone, a left peripheral zone and a right peripheral zone, which are separated by the corridor and the lower viewing zone, where the optimized free-form surface is formed such that low mean power zones are present in the upper viewing zone and at least one of the left peripheral zone and the right peripheral zone where, in the specific as-worn position, a mean refractive power experienced by a wearer does not exceed the first refractive power, in particular the first mean refractive power plus 0.125 D in the low mean power zones. Furthermore, the target lens design is chosen such that after the optimization of the at least one free-form surface the low mean power zones occupy at least 40% of the area of the progressive spectacle lens and the low mean power zones occupy such an area of the left peripheral zone and/or the right peripheral zone that, in the specific as-worn position, the accommodative response of the wearer relative to the usual response that the eye exhibits with a single vision lens according to a distance prescription is not altered during near vision tasks but an image in front of or on the fovea is created, or at least the accommodative lag on the fovea is minimized.

According to the present aspect of the disclosure the round progressive spectacle lens may be a round progressive spectacle lens which has a diameter of at least 40 mm. In this case, the target lens design is chosen such that the low mean power zones occupy at least 40% of the area of the progressive spectacle lens which lies within a diameter of 40 mm around the geometric center of the progressive spectacle lens.

The disclosure further provides a computer programs with program code for performing all method steps of the inventive computer implemented methods of designing a progressive spectacle lens when the computer program is loaded or executed in a computer.

Although some further developments of the progressive spectacle lens and of the computer implemented method of designing a progressive spectacle lens have only be described with respect to the some aspects of the present disclosure, a person skilled in the art recognizes that the same further developments as described with respect to the some aspect of the disclosure apply also to the progressive spectacle lens and of the computer implemented method of designing a progressive spectacle lens according to the other aspects of the disclosure.

BRIEF DESCRIPTION OF THE DRAWINGS

Further features, properties, and advantages of the present disclosure will become apparent from the following description of exemplary embodiments in conjunction with the accompanying drawings, wherein.

DESCRIPTION OF EXEMPLARY EMBODIMENTS

Figure 1:
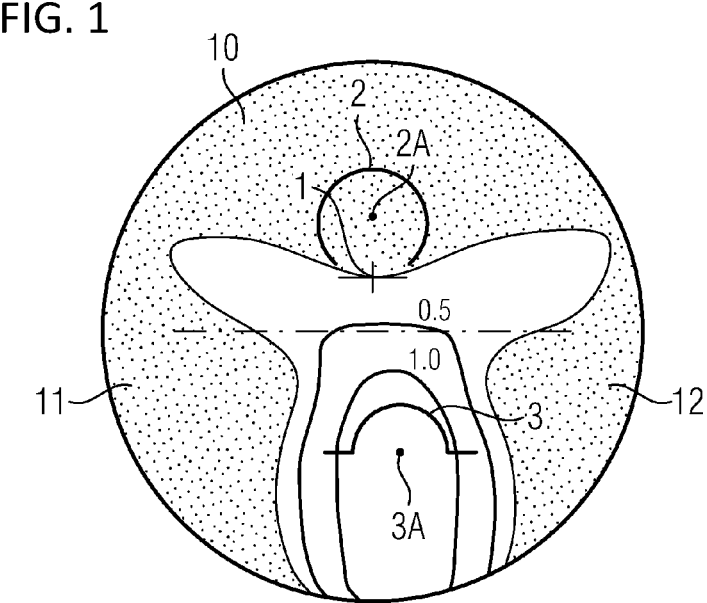
FIG. 1 shows the ray traced mean addition power contours for the roving eye within a 40 mm diameter circle around the geometric center of the progressive spectacle lens with the addition power of about 1.5 D.

Before turning to a description of exemplary embodiments of the present disclosure, an explanation of some expressions used throughout the following description will be given below.

The term "free-form surface" refers to a surface which may freely be formed during the manufacturing process and which does not need to show axial symmetry or rotational symmetry. In particular, a free-form surface may lead to different powers in different sections of the surface. The use of free-form surfaces allows for improving the quality of spectacle lenses with regard to imaging quality experienced by the wearer, as the spectacle lens can be optimized with respect to individual prescription values of the wearer, as well as to individual centration and frame data. Free-form surfaces of progressive power lenses include a larger number of parameters, which may be taken into account in the calculation of the surface than in the calculation of the free-form surfaces for single vision lenses, e.g. the progression length or the addition power.

The term "progressive spectacle lens" refers to a spectacle lens with at least one progressive surface that provides increasing mean addition power from an upper viewing zone for distance vision to a lower viewing zone for near vision. In the context of the present disclosure, a progressive spectacle lens may be a spectacle lens before edging to fit to a spectacle frame or after edging.

The term "surface astigmatism" means a reference to a measure of the degree to which the curvature of a lens varies among intersecting planes which are normal to the surface of the lens at a point of the surface. The surface astigmatism is equal to the difference between the minimum and maximum curvature of the lens surface in any of those intersecting planes multiplied by (n−1), where n is the reference index of refraction.

The term "fitting cross" designates a marking located at a point on a surface of a progressive spectacle lens which is stipulated by the manufacturer as a reference point for positioning the progressive spectacle lens in front of a wearer's eye. This means that the "fitting cross" is the marking of the "fitting point" on the lens surface as provided by the manufacturer.

The term "refractive power" implies the net power error calculated from optical ray tracing set up for the roving eye viewing objects at infinity with the lens fitted to line up the center of the pupil with the fitting cross and the center of rotation of the eye located 27 mm behind the back vertex point of the lens. This power is referenced to the sphere originating in the center of rotation of the eye and touching the back vertex point of the lens and known as the "reference sphere." The refractive power is determined by computing the vergence delivered at the reference sphere by the lens and subtracting the corresponding vergence required by the eye in order for a sharp image to be seen. This measures how well the lens meets the focal needs of the eye under the conditions of the selected eye—lens model. The model includes the Listing rotation modeling of the eye turn and assumes that the lens has a typical pantoscopic tilt of 7° at the fitting cross and a wrap angle of 0°. Refractive power of a lens like a progressive spectacle lens at a given location (this is usually a location on the reference sphere centered at the center of rotation of the eye and touching the back vertex of the lens) in ophthalmic optics is usually specified as a combination of the three scalar values: sphere power, cylinder (astigmatism), and cylinder axis. The mean refractive power of the lens is equal to the sphere power plus half the value of the cylinder, i.e.

$$M=S+C/2,$$

where M is the mean refractive power, S the sphere power, and C the cylinder or astigmatic power. In this context, sphere is a power of a lens that brings a paraxial pencil of parallel light to a single focus, where a paraxial pencil of parallel light is a pencil of light in which the distance of the light rays contained in the pencil of light from the optical axis of the lens is small and the angles of the rays of light with respect to the optical axis can be approximated according to $\sin \alpha \approx \alpha$, and cylinder refers to the ability of a spectacle lens to bring a paraxial pencil of parallel light to two separate line foci mutually at right angles. In this context, the term "principal meridian" refers to one of two mutually perpendicular meridians of a cylindrical power lens which are parallel to the two lines of foci, where the term "meridian" refers to a plane which contains the center of curvature of a surface and the normal-vector at the center of curvature. Related to the astigmatic power is the "cylindrical power" which stands for the difference of powers in the two principal meridians. The direction of the principal meridian which is chosen as reference for the cylindrical power is called "cylinder axis".

The term "distance reference point" (DRP) refers to a point on the surface of the upper half of the progressive spectacle lens at which the refractive power for distance vision applies.

The expression "upper viewing zone" refers to a zone in the surroundings of the distance reference point which has a refractive power that corresponds to or is close to the distance vision power and has an astigmatic error for the wearer in the specific as-worn position below 0.5 D.

The term "near reference point" (NRP) refers to a point on the surface of the lower half of the progressive spectacle lens at which the refractive power of the near vision applies.

The expression "lower viewing zone" refers to a zone in the surroundings of the near reference point which has a refractive power that corresponds to or is close to the near vision power and has an astigmatic error for the wearer in the specific as-worn position below 0.5 D.

The term "corridor" describes an area between the upper viewing zone and the lower viewing zone in which the refractive power gradually changes from the distance refractive power to the near refractive power and in which the surface astigmatism is below 0.5 D.

The term "peripheral zone" refers to zones which have an astigmatic error for the wearer in the specific as-worn position of 0.5 D or above and which are located on the left and on the right of the corridor and the lower viewing zone.

The term "mean addition power" shall refer to the ray-traced refractive power at a given location of the lens minus the mean refractive power at the distance reference point.

The term "surface addition power" refers to the surface power of the lens at a given location minus the surface power at the distance reference point. If a scalar variant of the surface addition power is used, this scalar variant is called "mean surface addition power", as the surface power generally speaking is a 2×2 tensor.

The expression "eye path" refers to a visual fixation locus which, when the progressive spectacle lens is correctly designed for wearer, typically coincides with a locus of horizontal mid-points between nasal and temporal 0.5 D astigmatism contours when the wearer adjusts the fixation from a distant object, i.e., a far field object, to a close object, i.e., near field object.

A first exemplary embodiment of the inventive progressive spectacle lens will now be described with respect to FIGS. 1 to 5. The first exemplary embodiment represents a progressive spectacle lens with an addition power of about 1.50 D.

FIG. 1 shows the ray traced mean addition power contours for the roving eye inside a 40 mm diameter round frame of the progressive spectacle lens of the first exemplary embodiment centered at the geometric center of the progressive spectacle lens. It shows, in addition to the fitting cross 1, a part-circle 2 the center of which is given by the distance reference point 2A and a semi-circle 3 with the near reference point 3A at its center. The contours shown in FIG. 1 represent lines at which the mean addition power of the progressive spectacle lens is 0.25 D, 0.5 D, and 1.0 D, respectively. The dotted zone in FIG. 1 represents a zone in which the mean addition power does not exceed 0.125 D. This zone is called low mean power zone in the following. Hence, in the low mean power zone the mean refractive power, i.e., the distance power plus the mean addition power, of the progressive spectacle lens is not higher than the distance refractive power plus 0.125 D. Please note that in the low mean power zone the mean refractive power of the progressive spectacle lens may even be lower than the distance refractive power.

Figure 2:
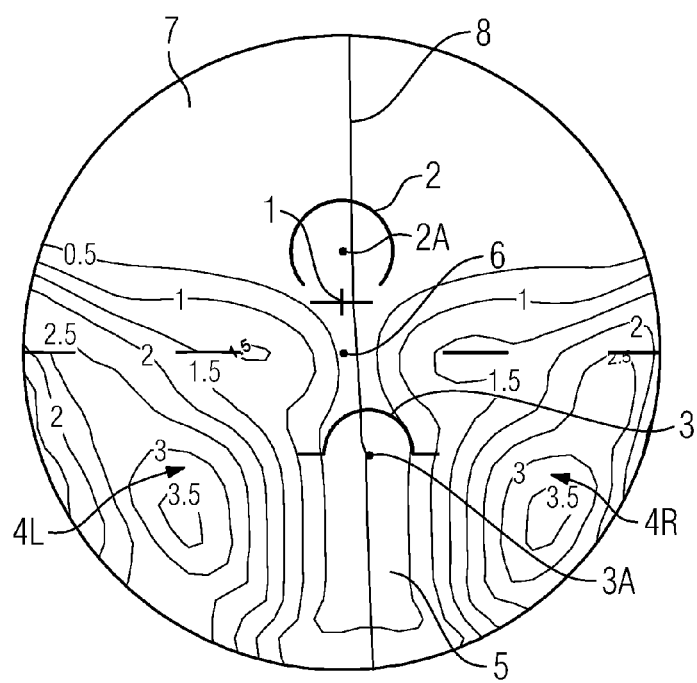
FIG. 2 shows a contour plot of surface astigmatism for the progressive spectacle lens of FIG. 1.

FIG. 2 is a contour plot showing surface astigmatism of the front surface of the progressive spectacle lens of FIG. 1. The surface astigmatism is indicated by contour lines representing steps of 0.5 D. As can be seen from FIG. 2, there are contour lines on the right hand side and the left hand side of the corridor representing a surface astigmatism of 0.5 D which delimit left and right peripheral zones 4L, 4R. The maximum values of the astigmatism reached in the left and right peripheral zones 4L, 4R are about 3.5 D.

The left and right peripheral zones 4L, 4R are separated by the lower viewing zone 5 and the corridor 6 of the progressive spectacle lens. The zone above the 0.5 D surface astigmatism contour is the upper viewing zone 7 of the progressive spectacle lens.

Figure 3:
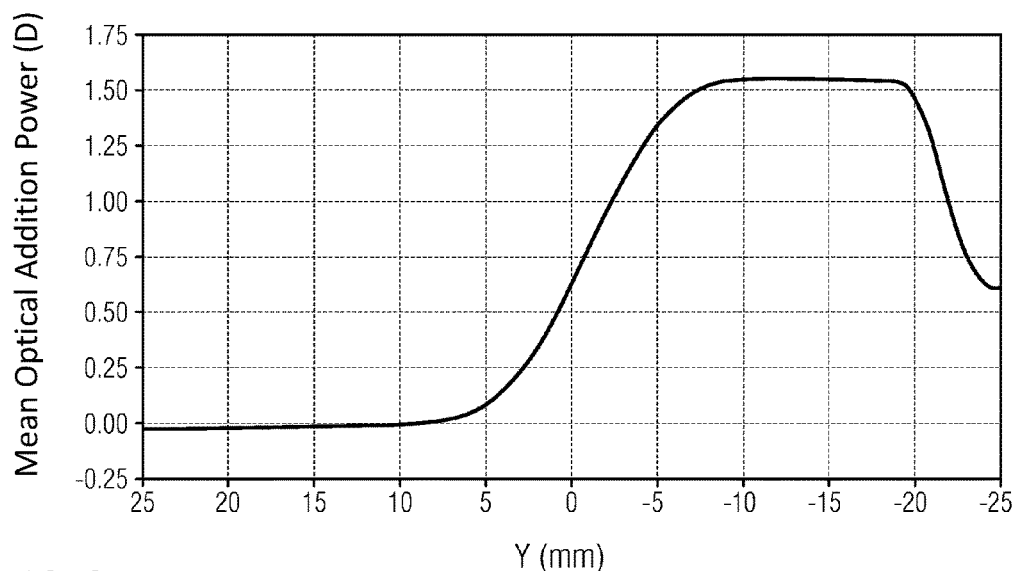
FIG. 3 shows a plot of the ray traced mean addition power for the progressive spectacle lens of FIG. 1 along an implied eye path shown in FIG. 2.

FIG. 2 also shows the intended eye path line 8 of the progressive spectacle lens. The distribution of the ray traced mean addition of the lens front surface along the eye path line is shown in the plot of FIG. 3. In this FIG., the horizontal axis represents the vertical distance y from an intersection of the eye path line 8 with a horizontal line running through the geometric center of the progressive spectacle lens, which is located at y=0, while the vertical axis represents the power that is added to the distance refractive power of the progressive spectacle lens in diopters (D). Please note that a value of 0 D mean addition power does not mean that the refractive power at this particular location is zero but that the refractive power at this particular location corresponds to the distance refractive power according to the prescription of a patient.

As can be seen from FIG. 3, the distance reference point DRP is located at a distance from y=0 mm of 8 mm towards the upper end of the progressive spectacle lens, i.e., at a location of y=−8 mm. The upper viewing zone of the present exemplary embodiment begins at about y=4 mm (the location of the fitting cross). As can further be seen from FIG. 1, the ray traced mean addition power is below 0.125 D up to the upper vertical end of the progressive spectacle lens.

The near reference point NRP is located at about y=−8 mm and the lower viewing zone begins at about y=−6.1 mm (the location of the 95% of the nominal mean addition power along the eye path). The lower viewing zone includes a plateau of the ray traced mean addition power, which extends from about y=−8 mm to about y=−20 mm and in which the ray traced mean addition power is nearly constant at 1.5 D. Hence, the near reference power is about 1.5 D higher than the distance reference power.

Between about y=4 mm and about y=−8 mm, the ray traced mean addition power rises steeply from about 0.125 D to about 1.5 D. The area in which the mean addition power rises steeply corresponds to the corridor 6.

Figure 4:
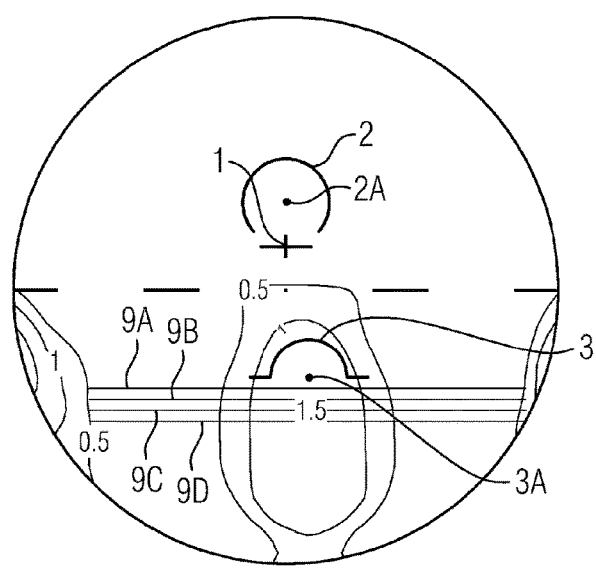
FIG. 4 shows a contour plot of the mean surface addition power for the progressive spectacle lens of FIG. 1.

FIG. 4 shows a contour plot representing the mean surface addition power with the contour lines incremented in steps of 0.5 D. In addition, FIG. 4 shows horizontal lines 9A to 9D crossing the near vision zone which run perpendicular to the eye path line 8.

Figure 5:
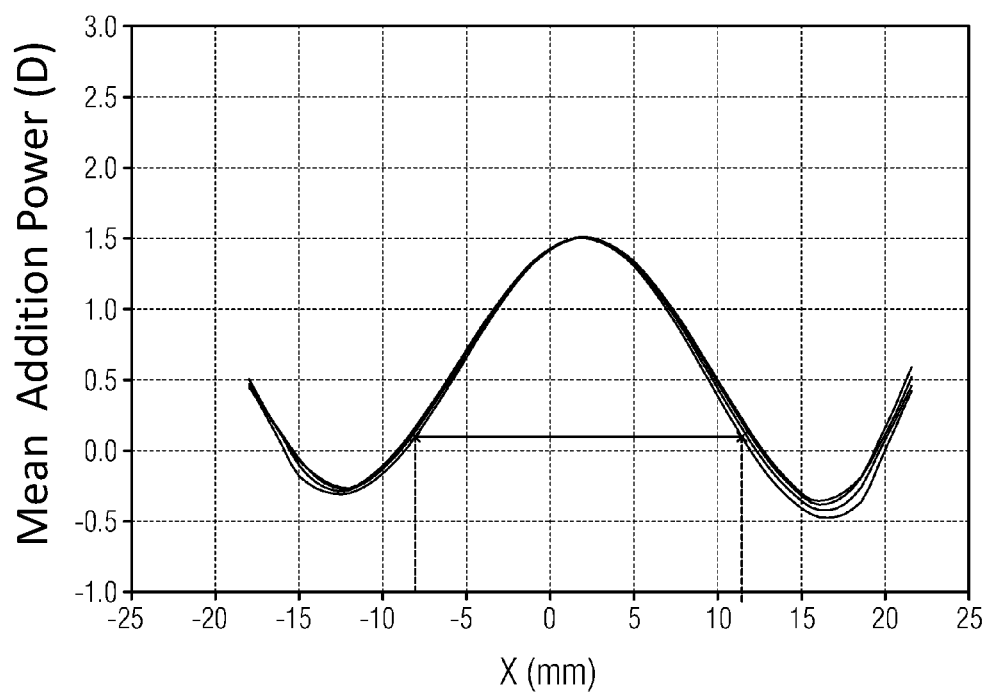
FIG. 5 shows plots of the mean surface addition power for the progressive spectacle lens of FIG. 1 along a plurality of horizontal lines shown in FIG. 4.

FIG. 5 shows a plot representing the surface addition powers along the horizontal lines 9A to 9D shown in FIG. 4. In this plot, the horizontal axis represents the distance x from a vertical line running through the geometric center of the progressive spectacle lens and the vertical axis represents the mean addition power in diopters (D). Please note that the eye path line 8 is skewed due to the convergence of the eyes when viewing the near objects and this line does not coincide with the zero value of the horizontal axis of FIG. 5 in the area of the horizontal lines 9A to 9D. From FIG. 5 it can be seen that the mean addition power is highest (1.5 D) at the eye path line and drops towards the left and the right rim of the progressive spectacle lens to values below 0.125 D at about x=−8 mm and about x=12 mm. The distance between these points is, in the present exemplary embodiment, 20 mm. Please note that towards the corridor and towards the lower rim of the progressive spectacle lens the distance between the low mean power zones in the left and right peripheral zones 4L, 4R becomes smaller (see FIG. 1) so that the distance of 20 mm is the maximum distance in the present exemplary embodiment.

In the present exemplary embodiment, the mean surface addition power drops further to a value below the distance reference power before it rises again to finally exceed a value of 0.125 D at about x=−16 mm and about x=19 mm, respectively. The zones between about x=−8 mm and about x=−16 mm and between about 12 mm and about 19 mm on the other side are part of the low mean power zone shown in FIG. 1.

As becomes clear from FIG. 1, the low mean power zone of the present exemplary embodiment is contiguous and includes almost the whole upper viewing zone and large parts of the left and right peripheral zones. Moreover, the gradient by which the mean addition power drops from the lower viewing zone 5 towards the left and right peripheral zones 4L, 4R is steep compared to conventional progressive ophthalmic progressive spectacle lenses, which will be exemplary described later with reference to FIGS. 16 to 20.

As already mentioned, the plot of FIG. 1 represents a circle with a diameter of 40 mm. The total area of this circle is 1256.65 mm². The area covered by the low mean power zone is 758.9 mm², which corresponds to 60.4% of the total area of the circle. Hence, a large fraction of the progressive ophthalmic progressive spectacle lens of the first exemplary embodiment provides virtually no mean addition power.

A second exemplary embodiment of the present disclosure will now be described with respect to FIGS. 6 to 10. The description of the second exemplary embodiment will focus on the differences to the first exemplary embodiment in order to avoid repetitions. Hence, features of the second exemplary embodiment which are substantially similar to features of the first exemplary embodiment are denominated by the same reference numerals as in the first exemplary embodiment and will not be explained again. The second exemplary embodiment represents a progressive spectacle lens in which the addition power in the near viewing zone is about 2.00 D instead of about 1.5 D.

Figure 6:
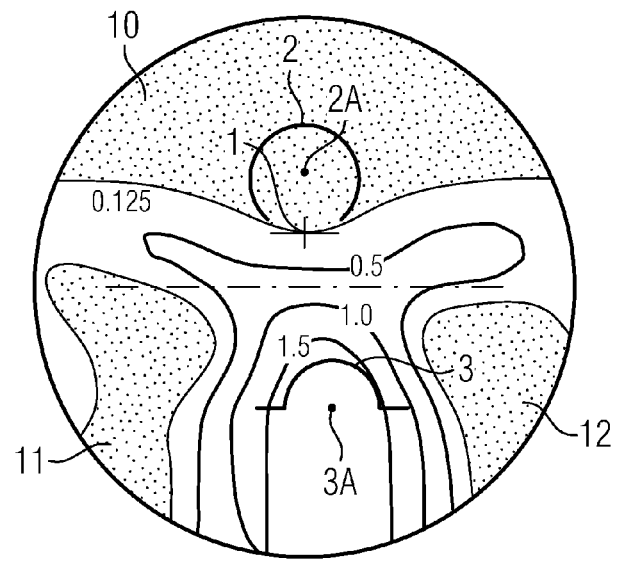
FIG. 6 shows the ray traced mean addition power contours for the roving eye within a 40 mm diameter circle around the geometric center of the progressive spectacle lens with the addition power of about 2.0 D.

FIG. 6 shows a 40 mm diameter round frame of the progressive spectacle lens of the second exemplary embodiment. FIG. 6 corresponds to FIG. 1 of the first exemplary embodiment. Like in the first exemplary embodiment, the ray traced mean addition power within the dotted area may as well be negative, i.e., the mean refractive power present in the low power region may be less than the distance refractive power.

Figure 7:
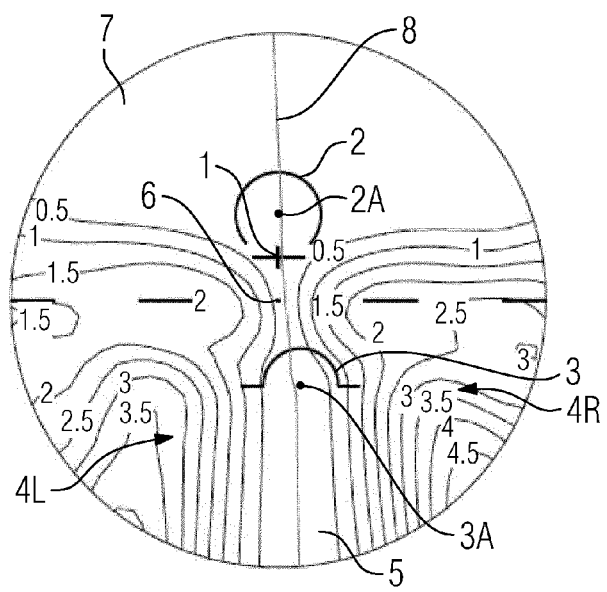
FIG. 7 shows a contour plot of surface astigmatism for the progressive spectacle lens of FIG. 6.

FIG. 7, which corresponds to FIG. 2 of the first exemplary embodiment, shows a contour plot representing surface astigmatism. As can be seen from FIG. 7, the maximum value of the astigmatism reached in the progressive spectacle lens of the second exemplary embodiment is about 4.5 in the right peripheral zone.

Figure 8:
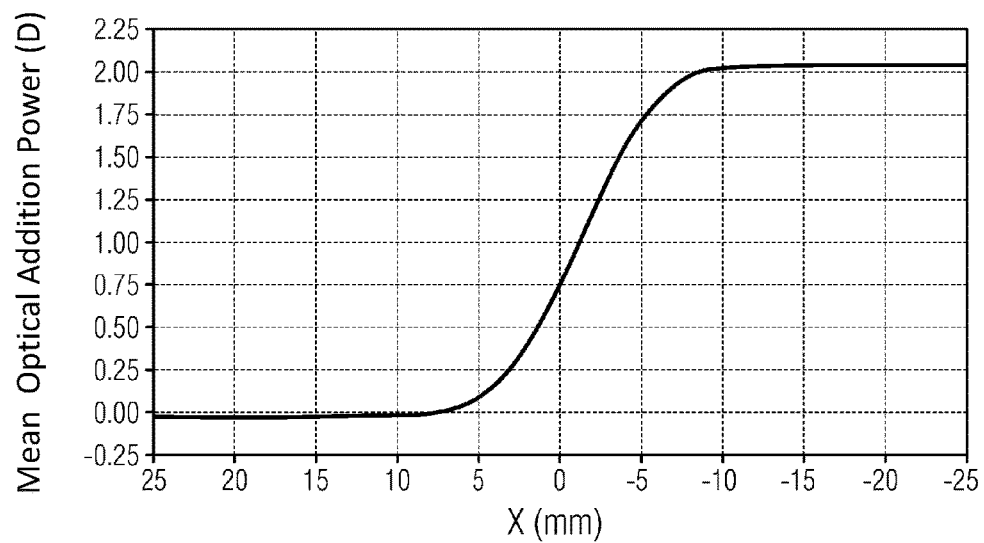
FIG. 8 shows a plot of the ray traced mean addition power for the progressive spectacle lens of FIG. 6 along an implied eye path shown in FIG. 7.

FIG. 8, which corresponds to FIG. 3 of the first exemplary embodiment, shows the ray traced mean addition power along the eye path line 8 shown in FIG. 7. The locations of the distance reference point DRP, the near reference point NRP and the corridor are the same as in the first exemplary embodiment. Please note that the ray traced mean addition power stays almost constant in the direction of the eye line 8 to the lower rim of the 50 mm diameter circle shown in FIG. 7.

Figure 9:
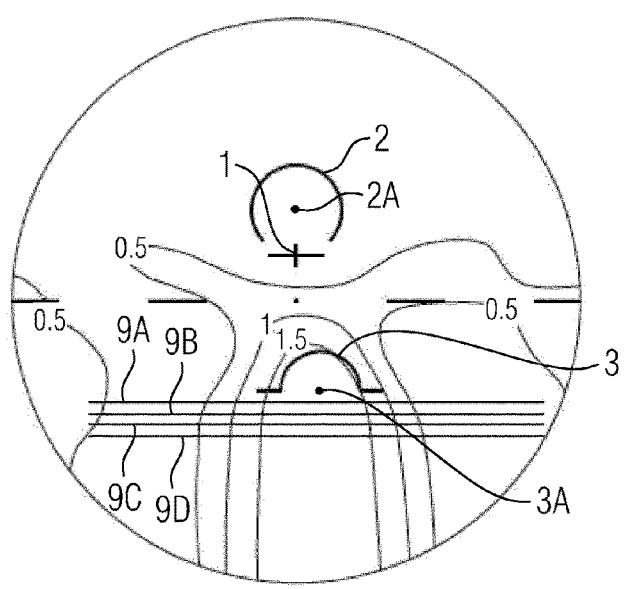
FIG. 9 shows a contour plot of mean surface addition power for the progressive spectacle lens of FIG. 6.

FIG. 9, which corresponds to FIG. 4 of the first exemplary embodiment, shows a contour plot representing the mean surface addition power in the progressive spectacle lens within the 50 mm diameter circle of the progressive spectacle lens.

Figure 10:
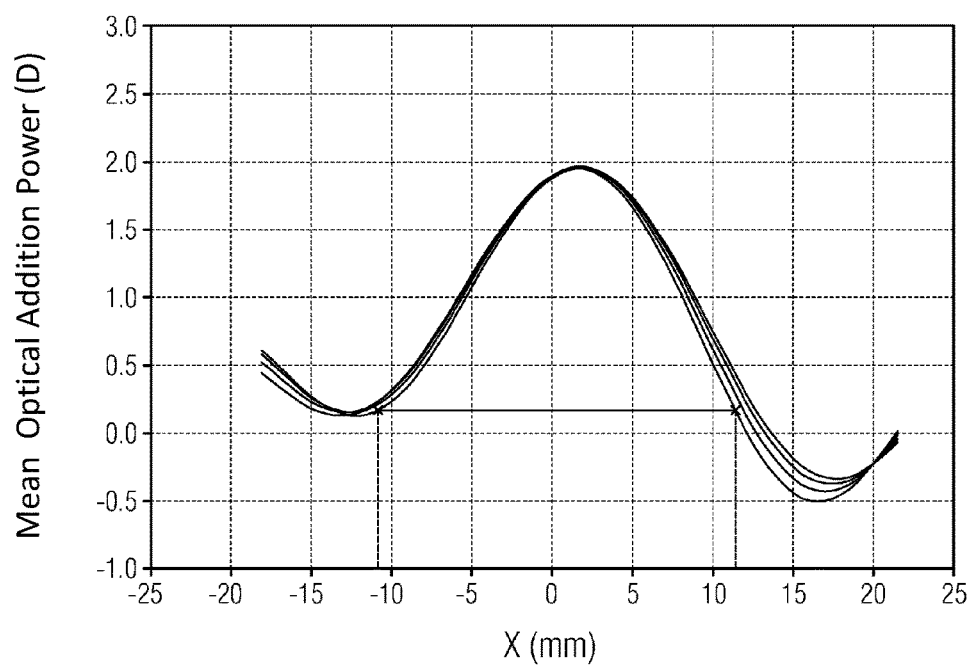
FIG. 10 shows plots of mean surface addition power for the progressive spectacle lens of FIG. 6 along a plurality of horizontal lines shown in FIG. 9.

FIG. 10, which corresponds to FIG. 5 of the first exemplary embodiment, shows a plot representing the mean surface addition power along the four horizontal lines 9A to 9D shown in FIG. 9. As can be seen from FIG. 10, the mean surface addition power drops in −x-direction as well as in +x-direction from 2.0 D at x=2 mm (which corresponds to the location of the eye line) to 0.125 D. The value of 0.125 D is reached at about x=−11 mm and about x=+12 mm, respectively. Hence, the low mean power zones in the left and right peripheral regions are spaced apart by about 23 mm. Please note that towards the corridor the distance between the low mean power zones in the left and right peripheral zones 4L, 4R becomes smaller while the distance between the low mean power zones 11, 12 in the left and right peripheral zones 4L, 4R only increases slightly towards the lower rim of the progressive spectacle lens (see FIG. 6). The distance between the low mean power zones in the left and right peripheral zones 4L, 4R does not exceed about 25 mm. The gradient by which the mean surface addition power drops from the lower viewing zone 5 towards the left and right peripheral zones 4L, 4R is slightly steeper than in the first exemplary embodiment.

In the second exemplary embodiment, the mean surface addition power in the right peripheral zone 4R drops further to a value below the distance reference power before it rises again to reach the distance refractive power at about x=22 mm. Hence, the width of the low mean power zone along the horizontal lines 9A to 9D in the right peripheral zone is more than 10 mm. In the left peripheral zone 4L, the mean surface addition power does not drop below zero along the horizontal lines 9A to 9D shown in FIG. 9 and reaches 0.125 D again at about x=−14 mm so that the width of the low mean power zone is about 3 mm, which results in a narrower low mean power zone than in the right peripheral zone 4R. This asymmetry is due to the fact that the eye line 8 is offset from x=0. However, please note from FIG. 6 that the width of the low mean power zone in the left peripheral zone 4L is narrowest in the region of the horizontal lines 9A to 9D so that the width of about 3 mm represents the minimum width of the low mean power zone in the left peripheral zone.

As can also be seen in FIG. 6, the low mean power zone of the present exemplary embodiment is not contiguous and includes three disjointed sub zones 10, 11, 12, where the first sub-zone 10 more or less coincides with the upper viewing zone 7, the second sub-zone 11 is located in the left peripheral zone 4L and the third sub-zone 12 is located in the right peripheral zone 4L. The first sub-zone 10 is connected with the second sub-zone 11 and the third sub-zone 12 by sections of the progressive spectacle lens in which the ray traced mean addition power is between 0.125 D and 0.5 D.

In the second exemplary embodiment, the area of the low mean power zone within the 40 mm diameter circle shown in FIG. 6 is 589.4 mm². Hence, the low mean power zone of the second exemplary embodiment occupies 46.9% of the area within the 40 mm diameter circle shown in FIG. 6.

A third exemplary embodiment of the inventive progressive spectacle lens will now be described with respect to FIGS. 11 to 15. Again, those elements that do not substantially differ from elements shown in the first exemplary embodiment will be denominated by the same reference numerals as in the first exemplary embodiment and will not be explained again to avoid repetitions. The third exemplary embodiment represents a progressive spectacle lens with an addition power of about 2.50 D.

Figure 11:
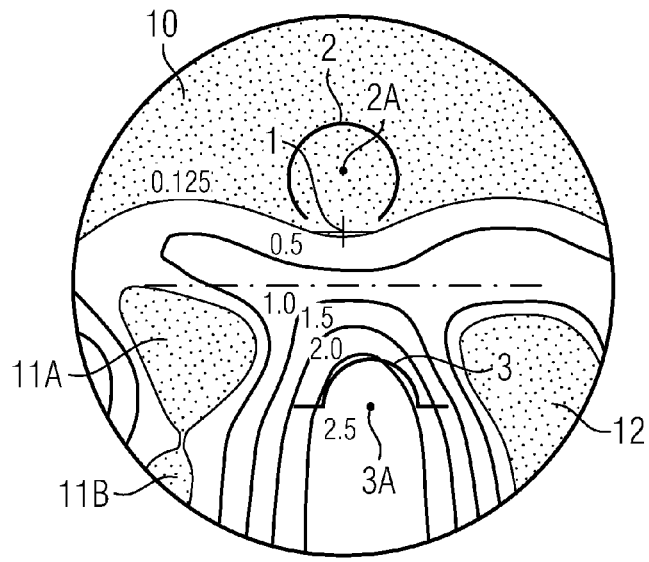
FIG. 11 shows the ray traced mean addition power contours for the roving eye within a 40 mm diameter circle around the geometric center of the progressive spectacle lens with the addition power of about 2.5 D.

FIG. 11 shows a 40 mm diameter round frame of the progressive spectacle lens of the third exemplary embodiment. FIG. 11 corresponds to FIG. 1 of the first exemplary embodiment. The dotted area is the low mean power zone of the third exemplary embodiment.

Figure 12:
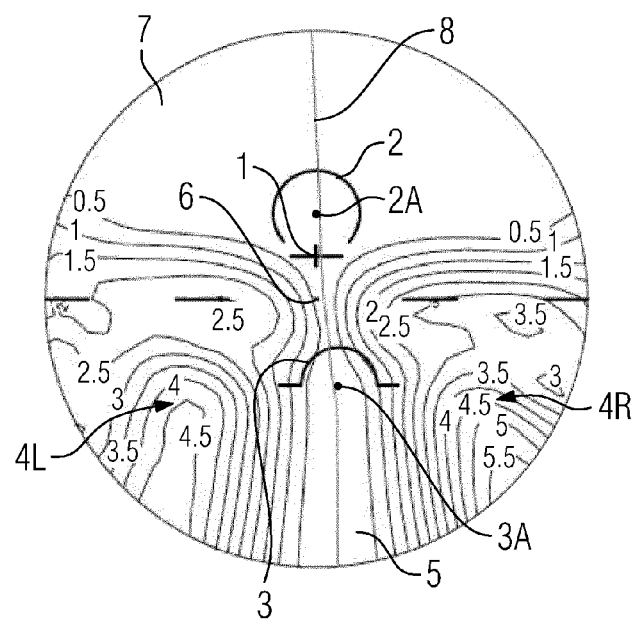
FIG. 12 shows a contour plot of surface astigmatism for the progressive spectacle lens of FIG. 11.

FIG. 12, which corresponds to FIG. 2 of the first exemplary embodiment, shows a contour plot of the surface astigmatism of the progressive spectacle lens according to the third exemplary embodiment of the disclosure. The maximum value of the astigmatism reached in the progressive spectacle lens is about 5.5 in the right peripheral zone 4R.

Figure 13:
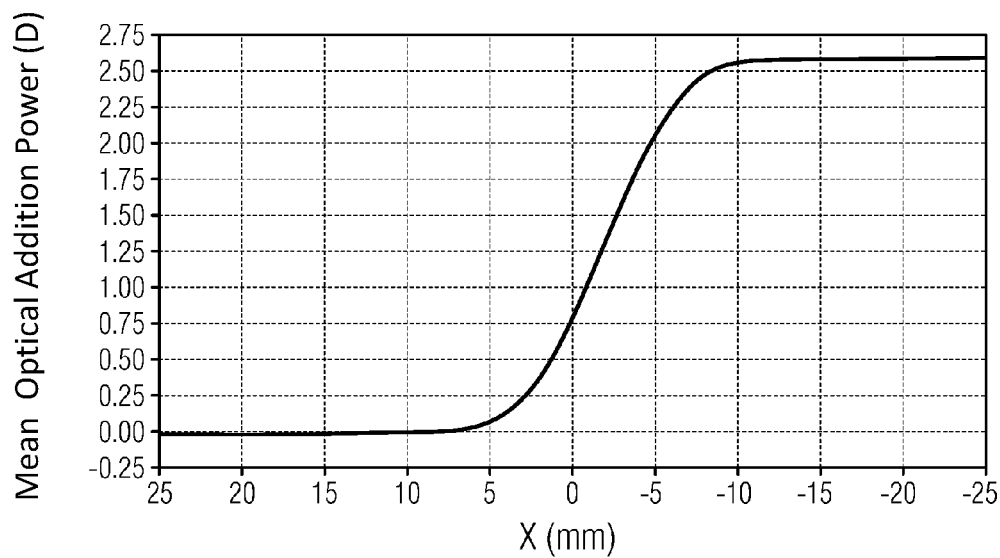
FIG. 13 shows a plot of the ray traced mean addition power for the progressive spectacle lens of FIG. 11 along a path shown in FIG. 12.

FIG. 13, which corresponds to FIG. 3 of the first exemplary embodiment, shows a plot of the ray traced mean surface addition power along the eye path line 8. The locations of the distance reference point DRP, the near reference point NRP, and the corridor are the same as in the first exemplary embodiment.

Figure 14:
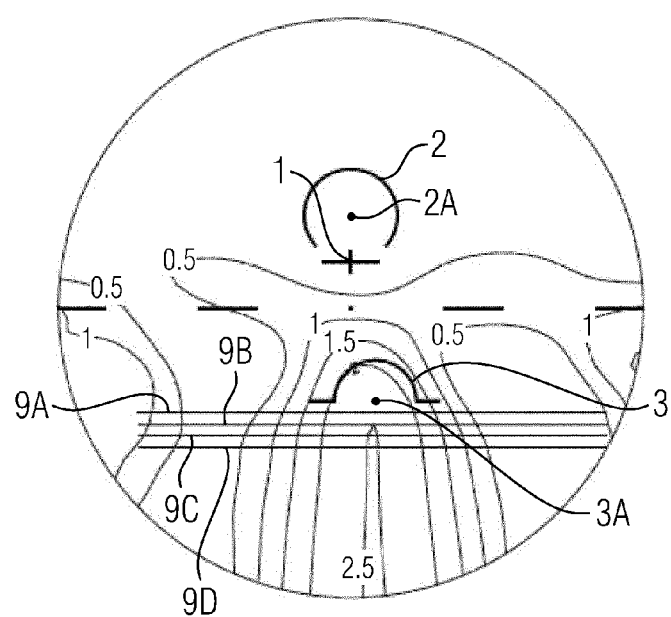
FIG. 14 shows a contour plot of mean surface addition power for the progressive spectacle lens of FIG. 11.
Figure 15:
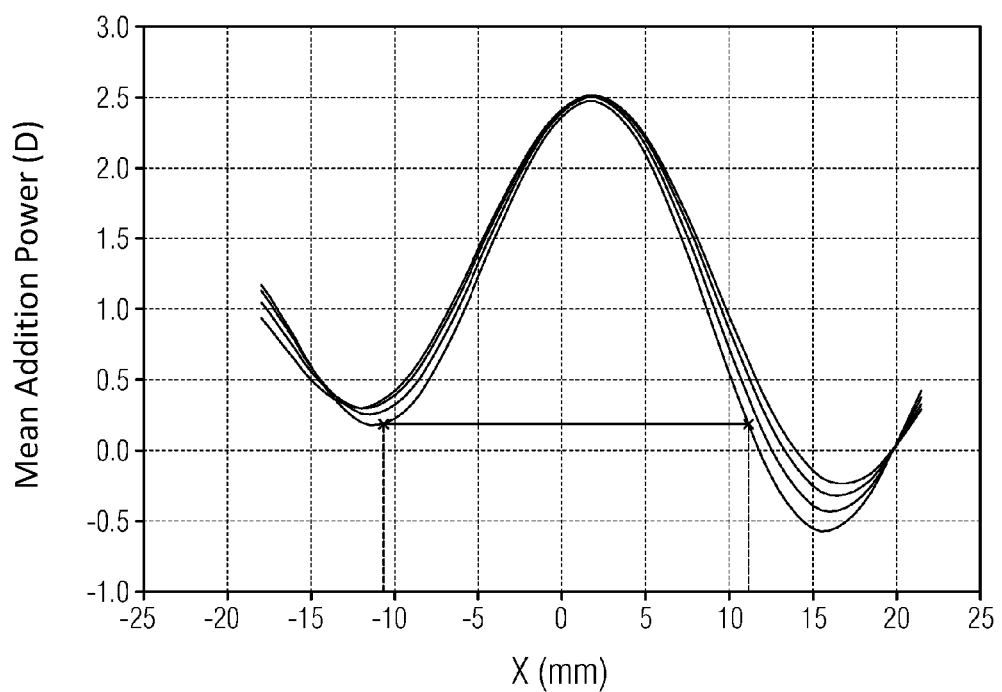
FIG. 15 shows plots of mean surface addition power for the progressive spectacle lens of FIG. 11 along a plurality of horizontal lines shown in FIG. 14.

FIG. 14, which corresponds to FIG. 4 of the first exemplary embodiment, shows a contour plot representing the mean surface addition power within the 50 mm diameter circle and FIG. 15, which corresponds to FIG. 5 of the first exemplary embodiment, shows the mean surface addition power along the horizontal lines 9A to 9D in FIG. 14. From the maximum mean surface addition power, the mean surface addition power drops to the left and the right until a mean surface addition power of 0.125 D is reached. Please note that on the left side, i.e., −x direction, the plot shows a mean surface addition power that lies above 0.125 D for three of the four lines 9A to 9D. This is due to the fact that the low mean power zone 11 in the left peripheral zone 4L comprises two separate parts 11A, 11B which are divided by a section of the left peripheral zone 4L in which the mean surface addition power lies above 0.125 D and reaches about 0.25 D. Three of the four vertical lines 9A to 9D run through the zone between the two parts of the low mean power zone 11 in the left peripheral zone 4L.

The value of 0.125 D is reached at about x=−11 mm and about x=+12 mm, respectively. Hence, the low mean power zones in the left and right peripheral regions are spaced apart by about 23 mm. The gradient by which the mean surface addition power drops from the lower viewing zone 5 towards the left and right peripheral zones 4L, 4R is even steeper than in the second exemplary embodiment.

The distance between the low mean power zone in the left peripheral zone 4L and the low mean power zone in the right peripheral zone 4R is about 23 mm. Please note that towards the corridor the distance between the low mean power zones in the left and right peripheral zones 4L, 4R becomes smaller and the distance between the low mean power zones in the left and right peripheral zones 4L, 4R only increases slightly towards the lower rim of the progressive spectacle lens. The distance between the low mean power zones in the left and right peripheral zones 4L, 4R does not exceed about 25 mm.

As can be seen from FIG. 11 the low mean power zones 10, 11A, 11B, 12 in the upper viewing zone 7, the left peripheral zone 4L and the right peripheral zone 4R are disjointed like in the second exemplary embodiment. Moreover the low mean power zone in the left peripheral zone is formed by two disjointed portions 11A, 11B. However, the mean surface addition power does not exceed 0.25 D between these two portions. The low mean power zones 11A, 11B, in the left peripheral zone 4L are connected to the low mean power zone 10 in the upper viewing zone 7 via a section of the progressive spectacle lens in which the mean surface addition power is between 0.125 D and 0.5 D. The low mean power zone 12 in the right peripheral zone 4R is connected to the low mean power zone 10 in the upper viewing zone 7 via a section of the progressive spectacle lens in which the mean surface addition power is between 0.125 D and 1.0 D.

The area of the 40 mm diameter circle shown in FIG. 11 that is occupied by the low mean power zone is 567.1 mm$^2$, which corresponds to a fraction of 45% of the total area within the 40 mm diameter circle.

In the embodiments of the progressive spectacle lens which have been described so far, the refractive power at the distance reference point is −2.5 DS (diopters of spherical power) and an free-form surface providing the mean addition power is located on the front surface of the progressive spectacle lens, while the back surface is spherical with a sphere of 2.4 D in 1.530 refractive index although the material of the progressive spectacle lens has a refractive index of 1.594 (It is a historical convention to indicate the surface power of lenses, in particular of spherical lenses, in the reference refractive index of 1.530 regardless of the material of the lens). However, the free-form surface providing the mean addition power may as well be located on the back surface of the progressive spectacle lens with the front surface being spherical. Please note that a toric back surface (if the free-form surface is formed on the front) or a toric front surface (if the free-form surface is formed on the back) would also be possible. A further option is to give both the back surface and the front surface a free-form shape so that the free-form back surface and the free-form front surface together provide the addition power of a lens.

In the following, a fourth exemplary embodiment will be described with respect to FIGS. 16 to 20. The fourth exemplary embodiment represents a progressive spectacle lens having the refractive index of 1.594 in which the refractive power at the distance reference point is −2.5 DS (diopters of spherical power) and the mean addition power in the near viewing zone is about 1.5 D as in the first exemplary embodiment. The main difference between the first exemplary embodiment and the fourth exemplary embodiment is that the mean addition power of the fourth exemplary embodiment is provided by a progressive free-form back surface rather than by a progressive free-form front surface, as was the case in the first exemplary embodiment. The front surface of the fourth exemplary embodiment is a sphere of 2.4 D in the reference refractive index of 1.530. Features of the fourth exemplary embodiment which are substantially similar to features of the first exemplary embodiment are denominated by the same reference numerals as in the first exemplary embodiment and will not be explained again.

Figure 16:
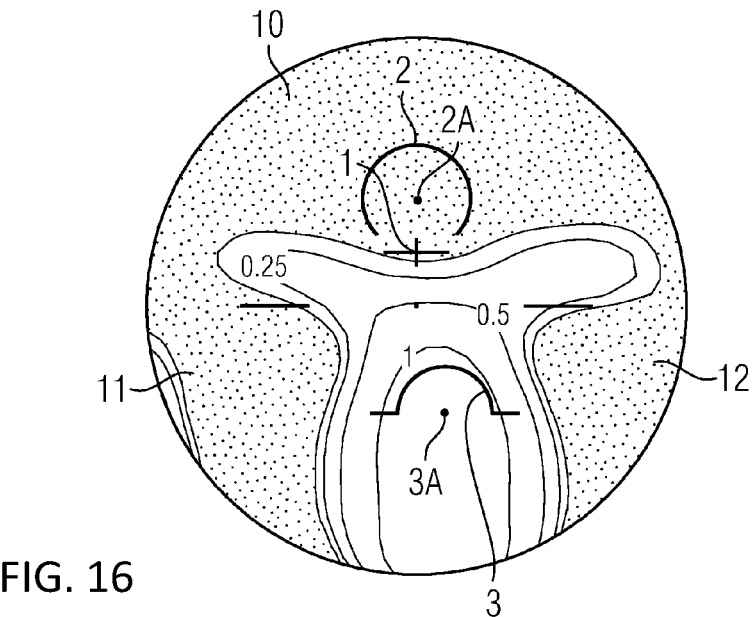
FIG. 16 shows the ray traced mean addition power contours for the roving eye within a 40 mm diameter circle around the geometric center of the progressive spectacle lens with the addition power of about 1.5 D having the progressive surface on the eye side of the lens.

FIG. 16 shows a 40 mm diameter round frame of the progressive spectacle lens of the second exemplary embodiment. FIG. 16 corresponds to FIG. 1 of the first exemplary embodiment. Like in the first exemplary embodiment, the ray traced mean addition power within the dotted area has the mean power not exceeding the distance vision power by more than 0.125 D.

Figure 17:
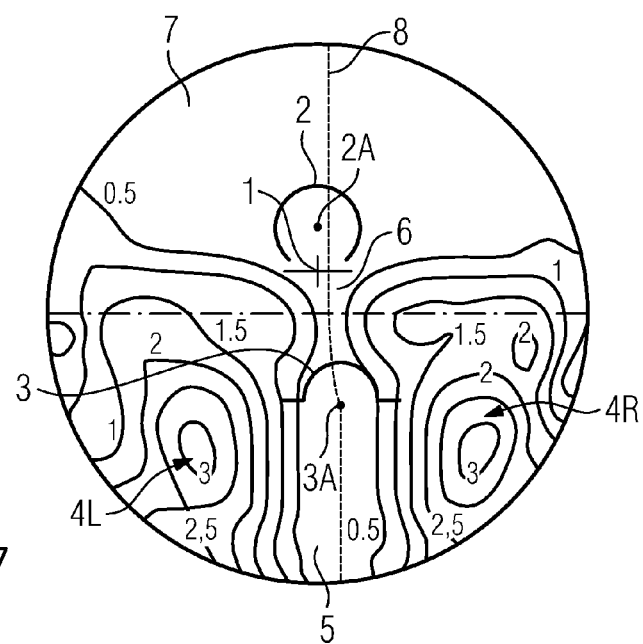
FIG. 17 shows a contour plot of the back surface astigmatism for the progressive spectacle lens of FIG. 16.

FIG. 17, which corresponds to FIG. 2 of the first exemplary embodiment, shows a contour plot representing surface astigmatism of the back surface. As can be seen from comparing FIG. 17 to FIG. 2, the surface astigmatism of the back surface in the fourth exemplary embodiment is almost identical to the surface astigmatism of the front surface in first exemplary embodiment.

Figure 18:
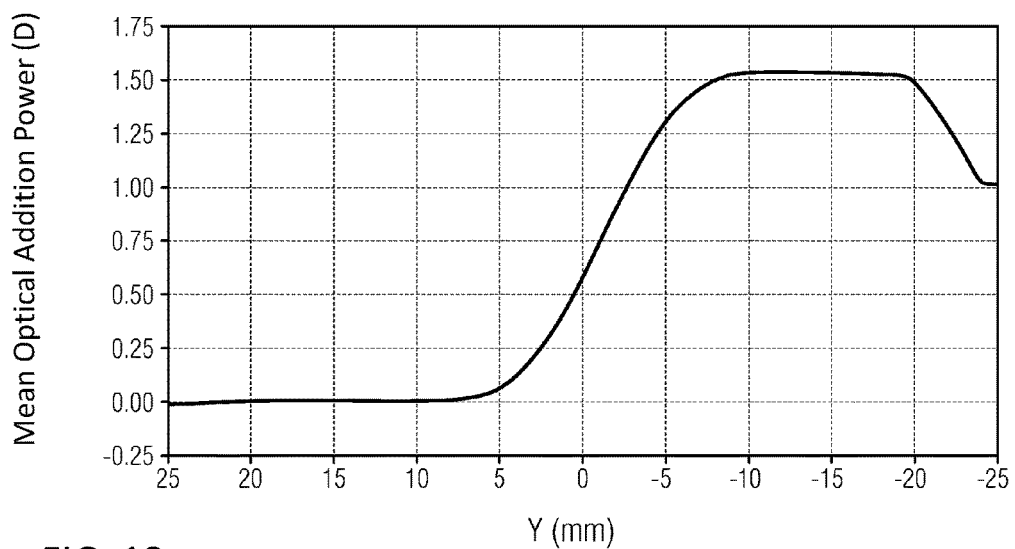
FIG. 18 shows a plot of the ray traced mean addition power for the progressive spectacle lens of FIG. 16 along an implied eye path shown in FIG. 17.

FIG. 18, which corresponds to FIG. 3 of the first exemplary embodiment, shows the ray traced mean addition power along the eye path line 8 shown in FIG. 17. The locations of the distance reference point DRP, the near reference point NRP, and the corridor are the same as in the first exemplary embodiment. Altogether, the characteristics of the ray traced mean addition power along the eye path line is very similar to the ray traced mean addition power along the eye path line of the first exemplary embodiment.

Figure 19:
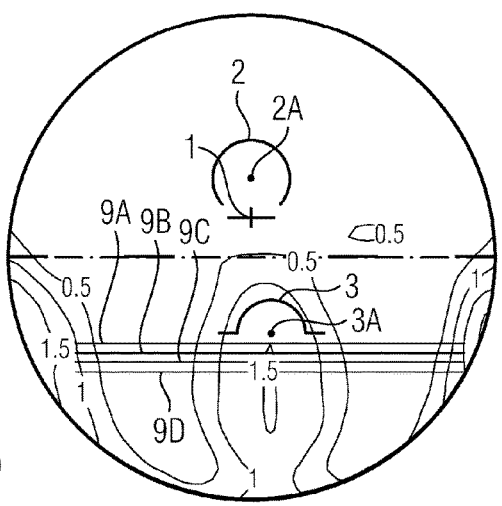
FIG. 19 shows a contour plot of the mean surface addition power on the back surface of the progressive spectacle lens of FIG. 16.

FIG. 19, which corresponds to FIG. 4 of the first exemplary embodiment, shows a contour plot representing the mean surface addition power of the back surface of the progressive spectacle lens of the fourth exemplary embodiment within the 50 mm diameter circle of the progressive spectacle lens.

Figure 20:
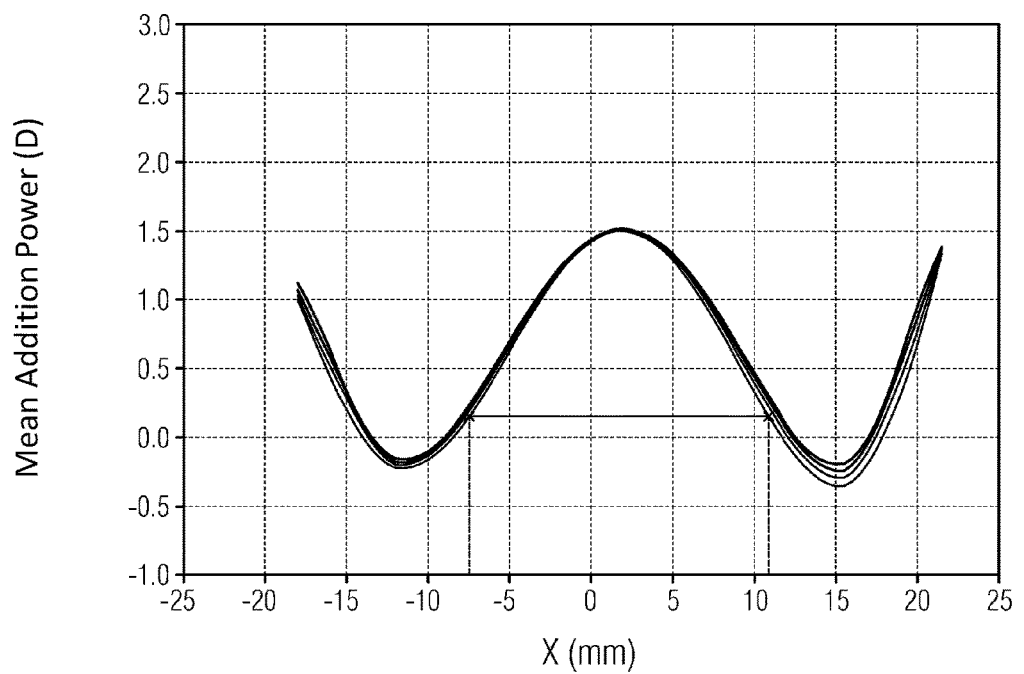
FIG. 20 shows plots of mean surface addition power for the progressive spectacle lens of FIG. 16 along a plurality of horizontal lines shown in FIG. 19.

FIG. 20, which corresponds to FIG. 5 of the first exemplary embodiment, shows a plot representing the mean surface addition power of the back surface of the progressive spectacle lens along the four horizontal lines 9A to 9D shown in FIG. 19.

The area of the low mean power zone within the 40 mm diameter circle shown in FIG. 16 is 764.4 mm² in the fourth exemplary embodiment. Hence, the low mean power zone of the fourth exemplary embodiment occupies 60.8% of the area within the 40 mm diameter circle shown in FIG. 16.

For comparison, a typical related art progressive spectacle lens having the refractive index of 1.594 with a mean addition power of 1.5 D is shown in FIGS. 21 to 25 which correspond to FIGS. 1 to 5 of the first exemplary embodiment, respectively.

Figure 21:
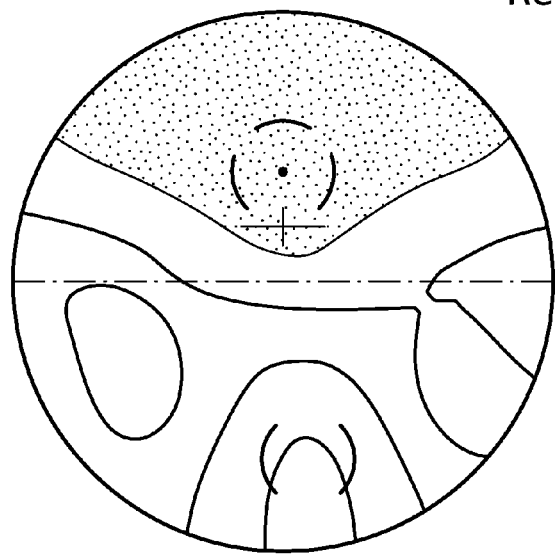
FIG. 21 shows the ray traced mean addition power contours for the roving eye within a 40 mm diameter circle around the geometric center of the progressive spectacle lens according to the related art.
Figure 22:
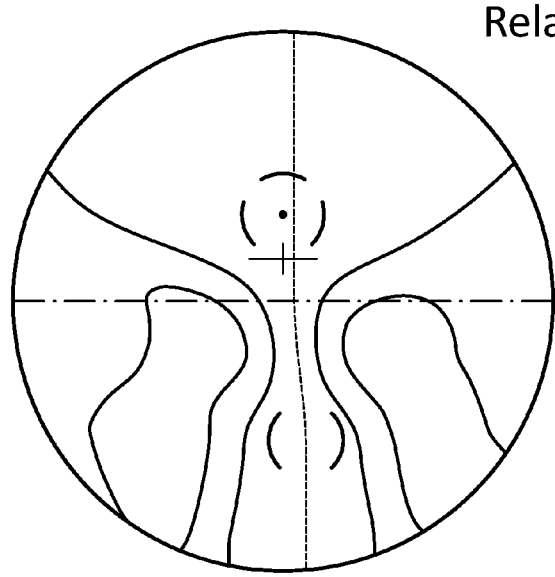
FIG. 22 shows a contour plot of surface astigmatism for the related art progressive spectacle lens of FIG. 21.
Figure 23:
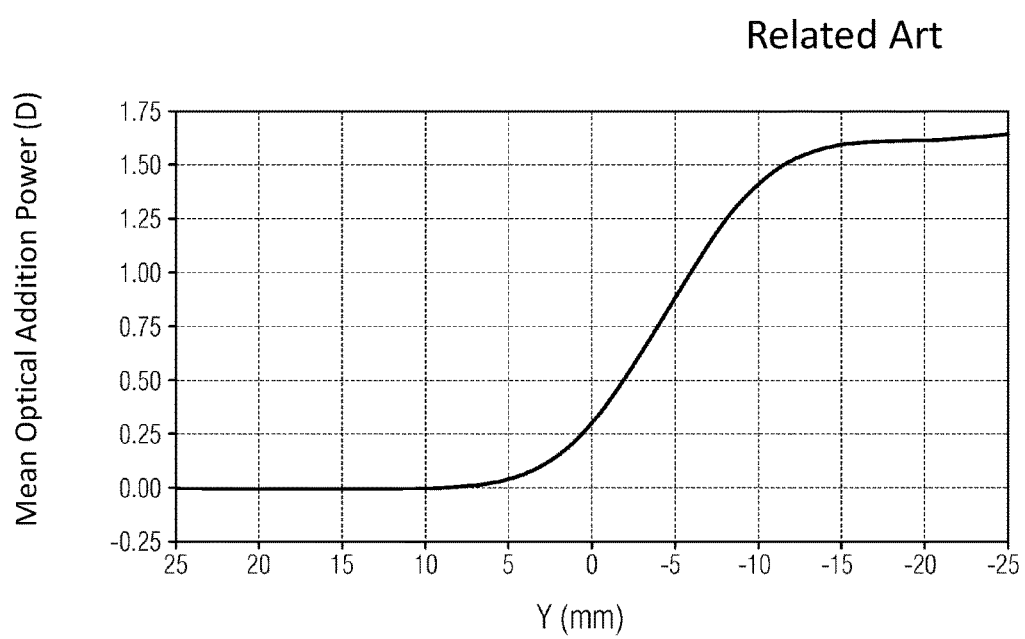
FIG. 23 shows a plot of the ray traced mean surface addition power for the related art progressive spectacle lens of FIG. 21 along an implied eye path shown in FIG. 22.
Figure 24:
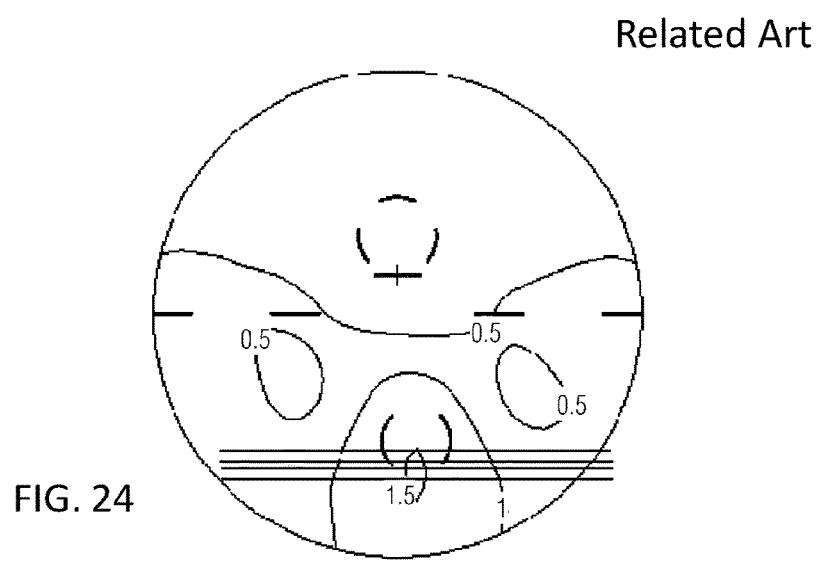
FIG. 24 shows a contour plot of mean surface addition power for the related art progressive spectacle lens of FIG. 21.
Figure 25:
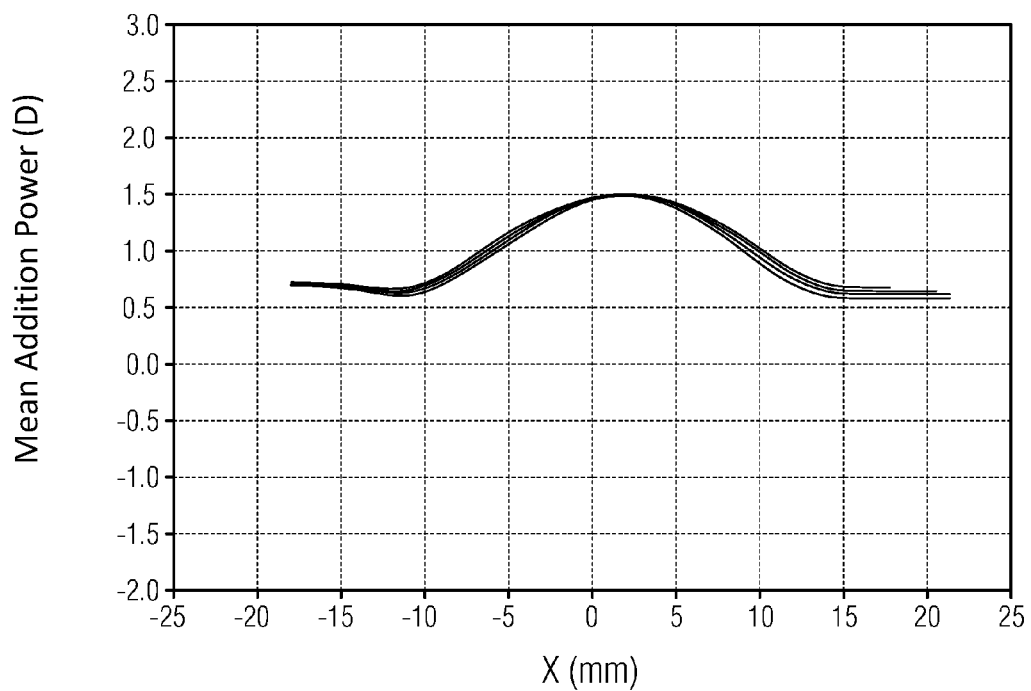
FIG. 25 shows plots of mean surface addition power for the related art progressive spectacle lens of FIG. 21 along a plurality of horizontal lines shown in FIG. 24.

As can be seen from FIG. 21, the ray traced mean addition power in the peripheral zones is always more than 0.125 D and in large areas of the peripheral zones also more than 0.5 D while in the progressive spectacle lenses of the first and fourth embodiments (which also have a ray traced mean addition power of 1.5 D) large sections of the peripheral zones do not exceed a ray traced mean addition power of 0.125 D (compare to FIGS. 1 and 16). The area of the low mean power zone (dotted area) within the 40 mm diameter circle of the related art progressive spectacle lens shown in FIG. 21 is 401.2 mm². Hence, the low mean power zone of the related art progressive spectacle lens occupies only about 32% of the area within the 40 mm diameter circle, while in an inventive progressive spectacle lens according to the first exemplary embodiment of the disclosure the low mean power zone occupies about 60% of the area within the 40 mm diameter circle, which is almost twice as much as in the related art progressive spectacle lens. Even in the progressive spectacle lenses of the second and third embodiments, which have more ray traced mean addition power than the related art progressive spectacle lens shown in FIGS. 21 to 25, the low mean power zone with 45% occupies a considerably larger fraction of the area within the 40 mm diameter circle than the low mean power zone of the related art progressive spectacle lens does. In addition, a comparison of FIGS. 5, 10, 15, and 20 with FIG. 25 shows that the gradient by which the mean surface addition power changes from the lower viewing zone towards the left and right peripheral zones is considerably steeper in the inventive progressive spectacle lenses than in the related art progressive spectacle lens.

The present disclosure provides a progressive spectacle lens in which a large low mean power zone with a ray traced mean addition power not exceeding 0.125 D is present which occupies at least 45% of an area within a 40 mm diameter circle around the geometric center of the progressive spectacle lens. In all depicted exemplary embodiments, the low mean power zone is present in the peripheral zones on both sides of the lower viewing zone and the corridor. In contrast thereto, the fraction of low mean power zones in related art progressive spectacle lenses does not exceed about 35% of an area within a 40 mm diameter circle around the geometric center of the respective progressive spectacle lenses. Moreover, the state of the art progressive spectacle lenses show no low mean power zones with a ray traced mean addition power below 0.125 D in the peripheral zones, or, if such low mean power zones are present in the peripheral zones, they are only present in one of the right and left peripheral zones and they only represent a negligible areal fraction of the respective peripheral zone.

According to an exemplary embodiment of the inventive method of manufacturing a progressive spectacle lens, the inventive progressive spectacle lens may be individually manufactured for a wearer. The method includes the steps of obtaining the specific as-worn position for the wearer, obtaining a first refractive power, in particular a first mean refractive power, for distance vision of the wearer, obtaining a second refractive power, in particular a second mean refractive power, for near vision of the wearer, and providing a semi-finished lens blank as a lens blank. In a semi-finished lens blank, one lens surface is already finished. This surface is typically a spherical or toric surface. In the present exemplary embodiment, the finished lens surface is the front surface. However it may as well be the rear surface if the free-form surface is to be formed on the front surface.

Based on the specific as-worn position for the wearer, the first refractive power, in particular the first mean refractive power, and the second refractive power, in particular the second mean refractive power, a free-form surface on the rear surface of the semi-finished lens blank is formed. This free-form surface defines the upper viewing zone (7) with the distance reference point (2A), the lower viewing zone (5) with the near reference point (3A) and the corridor (6) between the upper viewing zone (7), the lower viewing zone (5), as well as a left peripheral zone (4L) and a right peripheral zone (4R), which are separated by the corridor (6) and the lower viewing zone (5). The free-form surface is formed such that low mean power zones (10, 11, 12) are present in the upper viewing zone (7) and at least one of the left peripheral zone (4L) and the right peripheral zone (4R). In the specific as-worn position, the mean refractive power experienced by a wearer does not exceed the first refractive power, in particular the first mean refractive power plus 0.125 D in the low mean power zones (10, 11, 12). Moreover, the at least one free-form surface is formed such that the low mean power zones (10, 11, 12) occupy at least 40% of the area of the progressive spectacle lens.

Although the free-form surface is formed on the rear surface of the semi-finished lens blank in the present exemplary embodiment of the inventive method, the free-form surface may as well be formed on the front surface. In this case, the rear surface of the semi-finished lens blank would be spherical or toric.

Please note that the lens blank does not need to be a semi-finished lens blank but may be any form of raw material suitable as starting point for forming a spectacle lens.

The spectacle lens may be designed by using a computer implemented method. In this method, the specific as-worn position for the wearer, the first refractive power, in particular the first mean refractive power, for distance vision of the wearer and the second refractive power, in particular the second mean refractive power, for near vision of the wearer are obtained or provided together with a target lens design. This target lens design defines:

a refractive power distribution of the progressive spectacle lens comprising the first refractive power, in particular the first mean refractive power, for distance vision and the second refractive power, in particular the second mean refractive power, for near vision, an upper viewing zone (7) with a distance reference point (2A) providing a first refractive power, in particular the first mean refractive power, adapted to distance vision;

a lower viewing zone (5) with a near reference point (3A) providing a second refractive power, in particular the second mean refractive power, adapted to near vision, the second refractive power, in particular the second mean refractive power, providing an addition power relative to the first refractive power, in particular the first mean refractive power;

a corridor (6) between the upper viewing zone (7) and the lower viewing zone (5) in which the refractive power gradually changes from the first refractive power, in particular the first mean refractive power, to the second refractive power, in particular the second mean refractive power; and a left peripheral zone (4L) and a right peripheral zone (4R) which are separated by the corridor and the lower viewing zone (5); wherein low mean power zones (10, 11, 12) are present in the upper viewing zone (7), the left peripheral zone (4L) and the right peripheral zone (4R) where the mean refractive power the wearer experiences in the specific as-worn position does not exceed the first refractive power, in particular the first mean refractive power, plus 0.125 D in the low mean power zones (10, 11, 12). The low mean power zones (10, 11, 12) occupy at least 40% of the area of the progressive spectacle lens.

Designing the spectacle lens comprises optimizing the shape of at least one of the front surface or the back surface in the specific as-worn position based on the target lens design. Information about how to optimize the shape of a spectacle lens surface can be found in EP 0 857 993 A2 or in Werner Köppen, "Konzeption und Entwicklung von Gleitsichtgläsern" DOZ 10/95, pages 42-46.

Although the present invention has been described with respect to four exemplary embodiments for illustrative reasons, it is clear to a person skilled in the art that exemplary embodiments which differ from the depicted exemplary embodiments are possible. For example, the present exemplary embodiments show progressive spectacle lenses with a maximum mean addition power of about 1.5 D, 2.0 D and 2.5 D. However, other maximum mean addition powers are possible. Typical maximum mean addition powers lie between 1.0 and 3.0 D while addition powers of 1.5 D to 2.5 D are the most common ones. The present disclosure shall, therefore, not be restricted to the specific embodiments given above but only by the appended claims.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

REFERENCE NUMERALS 1 fitting cross
2 part-circle
3 semi-circle
4 L,R left, right peripheral zone
5 lower viewing zone
6 corridor
7 upper viewing zone
8 eye line
9 A-D horizontal lines
10 sub-zone
11 sub-zone
12 sub-zone

The invention claimed is:

1. A progressive spectacle lens comprising:
an upper viewing zone having a distance reference point, the upper viewing zone providing a first refractive power configured for distance vision in a specific as-worn position;
a lower viewing zone having a near reference point, the lower viewing zone providing a second refractive power configured for near vision in the specific as-worn position, wherein the second refractive power includes an addition power relative to the first refractive power;
a corridor arranged between the upper viewing zone and the lower viewing zone, the corridor having a refractive power that changes gradually from the first refractive power to the second refractive power in the specific as-worn position;
a left peripheral zone and a right peripheral zone, which are separated from each other by the corridor and the lower viewing zone; and
a first low mean power zone located in the upper viewing zone, a second low mean power zone located in the left peripheral zone, and a third low mean power zone located in the right left peripheral zone, each low mean power zone having a mean refractive power that does not exceed the first refractive power plus 0.125 diopter (D) in the specific as-worn position;
wherein the low mean power zones jointly occupy at least 40% of an area of the progressive spectacle lens.

2. The progressive spectacle lens as claimed in claim 1, wherein the refractive power in the specific as-worn position is calculated by:
simulating an eye roving around a center of rotation of the eye,
performing optical ray tracing of the roving eye viewing objects at infinity with the progressive spectacle lens fitted to line up a center of a pupil of the eye with a fitting point and the center of rotation of the eye located at a specific distance in a range between 20 mm and 30 mm behind a back vertex point of the progressive spectacle lens when the eye is in a primary position, the refractive power is referenced to the sphere originating in the center of rotation of the eye and touching the back vertex point of the progressive spectacle lens, and wherein the simulation includes a Listing rotation modeling of the eye turn and assumes that the lens has a pantoscopic tilt selected from the range between −20° and +30° at the fitting point and a wrap angle selected from the range between −5° and +15° at the fitting point.

3. The progressive spectacle lens as claimed in claim 1, wherein the mean refractive power experienced by a wearer in the left peripheral zone and the right peripheral zone is always below the second refractive power.

4. The progressive spectacle lens as claimed in claim 1, wherein the progressive spectacle lens is a round progressive spectacle lens having a diameter of at least 40 mm, and
wherein the low mean power zones occupy at least 40% of an area of the progressive spectacle lens which lies within a diameter of 40 mm around a geometric center of the progressive spectacle lens.

5. The progressive spectacle lens as claimed in claim 1, wherein the addition power provided by the second refractive power relative to the first refractive power lies in a range of from 1.0 D to 3.0 D.

6. The progressive spectacle lens as claimed in claim 1, wherein a distance between the second low mean power zone located in the left peripheral zone and the third low mean power zone located in the right peripheral zone is no larger than 25 mm.

7. The progressive spectacle lens as claimed in claim 1, wherein the second low mean power zone located in the left peripheral zone and the third low mean power zone located in the right peripheral zone extend to a location below a horizontal line running through a near reference point.

8. The progressive spectacle lens as claimed in claim 7, wherein the second low mean power zone located in the left peripheral zone and the third low mean power zone located in the right peripheral zone extend at least to horizontal lines respectively located 5 mm above and below the horizontal line running through the near reference point.

9. The progressive spectacle lens as claimed in claim 1, wherein the first low mean power zone located in the upper viewing zone covers all of an area of the progressive spectacle lens within a diameter of 40 mm around the geometric center of the progressive spectacle lens that lies above a horizontal line running through a distance reference point.

10. The progressive spectacle lens as claimed in claim 1, wherein the first low mean power zone located in the upper viewing zone, the second low mean power zone located in the left peripheral zone, and the third low mean power zone located in the right peripheral zone form a contiguous low mean power zone.

11. The progressive spectacle lens as claimed in claim 10, wherein the second refractive power represents an addition power of 1.5 D or less to the first refractive power.

12. The progressive spectacle lens as claimed in claim 10, wherein the contiguous low mean power zone occupies at least 50% of an area of the progressive spectacle lens that lies within a diameter of 40 mm around the geometric center of the progressive spectacle lens.

13. The progressive spectacle lens as claimed in claim 1, wherein the second refractive power represents an addition power of more than 1.5 D and up to 2.0 D to the first refractive power, wherein the second and third low mean power zones located in the left and right peripheral zones, respectively, are separated from the first low mean power zone located in the upper viewing zone, wherein areas in which the mean refractive power is more than the first refractive power plus 0.125 D, but does not exceed the first refractive power plus 0.5 D, connect the first low mean power zone located in the upper viewing zone with each of the second and third low mean power zones located in the left and right peripheral zones, respectively.

14. The progressive spectacle lens as claimed in claim 1, wherein the second refractive power represents an addition power of more than 2.0 D and up to 2.5 D to the first refractive power, wherein the second and third low mean power zones located in the left and right peripheral zones, respectively, are separated from the first low mean power zone located in the upper viewing zone, wherein an area in which the mean refractive power is more than the first refractive power plus 0.125 D, but does not exceed the first refractive power plus 0.5 D, connects the first low mean power zone located in the upper viewing zone with at least one of the second or third low mean power zones located in the left and right peripheral zones, respectively.

15. The progressive spectacle lens as claimed in claim 1, wherein a surface astigmatism inside a 40 mm diameter of the progressive spectacle lens does not exceed 5.5 D.

16. The progressive spectacle lens as claimed in claim 15, wherein the surface astigmatism inside the 40 mm diameter of the progressive spectacle lens does not exceed 3.5 D.

17. The progressive spectacle lens as claimed in claim 15, wherein the surface astigmatism inside the 40 mm diameter of the progressive spectacle lens does not exceed 4.5 D.

18. The progressive spectacle lens as claimed in claim 1, wherein the second low mean power zone in the left peripheral zones and the third low mean power zone located in the right peripheral zone occupy at least 10% of the area of the progressive spectacle lens.

19. The progressive spectacle lens as claimed in claim 1, wherein the second and third low mean power zones occupy such as area of at least one of the left peripheral zone or the right peripheral zone that, in the specific as-worn position, an accommodative lag on a fovea is minimized, and, optionally, an accommodative response of a wearer relative to a usual response an eye exhibits with a single vision lens according to a distance prescription is not altered during near vision tasks, but an image in front of or on the fovea is created.

20. A method of manufacturing a progressive spectacle lens configured to be worn by a specific wearer in a specific as-worn position, the method comprising:
obtaining or providing the specific as-worn position for the wearer;
obtaining or providing a refractive power for a distance vision of the wearer;
obtaining or providing a refractive power for a near vision of the wearer;
providing a lens blank; and
configuring the lens blank based on the specific as-worn position for the wearer,
the refractive power for distance vision, and the refractive power for near vision by forming at least one free-form surface on the front surface or the rear surface of the lens blank, the at least one free-form surface including:
an upper viewing zone having a distance reference point, the upper viewing zone providing, in the specific as-worn position, a first refractive power configured for distance vision;
a lower viewing zone with a near reference point, the lower viewing zone providing in the specific as-worn position a second refractive power, configured for near vision,
a corridor between the upper viewing zone and the lower viewing zone;
a left peripheral zone and a right peripheral zone that are separated by the corridor and the lower viewing zone; and
a first low mean power zone located in the upper viewing zone and at least one of a second low mean power zone located in the left peripheral zone or a third low mean power zone located in the right peripheral zone, wherein a mean refractive power experienced by a wearer in the specific as-worn position does not exceed the first refractive power plus 0.125 D in the first, second, and third low mean power zones; and
forming the low mean power zones of the at least one free-form surface to occupy at least 40% of an area of the progressive spectacle lens.

21. A computer implemented method of designing a progressive spectacle lens configured to be worn by a specific wearer in a specific as-worn position, the spectacle lens having a front surface and a back surface, the method comprising:

obtaining or providing the specific as-worn position for the wearer;

obtaining or providing a first refractive power for distance vision of the wearer;

obtaining or providing a second refractive power for near vision of the wearer;

providing a target lens design by defining:

a refractive power distribution of the progressive spectacle lens including the first refractive power for distance vision and the second refractive power for near vision;

an upper viewing zone having a distance reference point, the upper viewing zone providing the first refractive power adapted to the distance vision;

a lower viewing zone having a near reference point, the lower viewing zone providing the second refractive power adapted to the near vision, the second refractive power providing an addition power relative to the first refractive power;

a corridor arranged between the upper viewing zone and the lower viewing zone in which a refractive power gradually changes from the first refractive power to the second refractive power; and a left peripheral zone and a right peripheral zone, which are separated by the corridor and the lower viewing zone;

a first low mean power zone arranged in the upper viewing zone, a second low mean power zone arranged in the left peripheral zone, and a third low mean power zone arranged in the right peripheral zone, the first, second, and third low mean power zones providing a mean refractive power to the wearer in the specific as-worn position that does not exceed the first refractive power plus 0.125 D;

arranging the first, second, and third low mean power zones to occupy at least 40% of the area of the progressive spectacle lens; and optimizing a shape of at least one of the front surface or the back surface in the specific as-worn position based on the target lens design.

22. The computer implemented method as claimed in claim 21, wherein a distance between the second low mean power zone in the left peripheral zone and the third low mean power zone in the right peripheral zone is no larger than 25 mm.

23. The computer implemented method as claimed in claim 21, wherein the progressive spectacle lens is a round progressive spectacle lens, the method further comprising:

choosing the target lens design to optimize the first, second, and third low mean power zones on the at least one free-form surface to occupy at least 40% of the area of the progressive spectacle lens that lies within a diameter of 40 mm around the geometric center of the round progressive spectacle lens.

24. The computer implemented method of designing a progressive spectacle lens as claimed in claim 21, the method further comprising:

choosing the target lens design to optimize the second and third low mean power zones in the left peripheral zones and in right peripheral zone, respectively, to occupy at least 10% of the area of the progressive spectacle lens.

25. The computer implemented method of designing a progressive spectacle lens as claims in claim 21, wherein the target lens design is chosen such that after the optimization of the at least one free-form surface the low mean power zones occupy such an area of at least one of the left peripheral zone or the right peripheral zone that, in the specific as-worn position, an accommodative lag on a fovea is minimized, and, optionally an accommodative response of the wearer relative to a usual response an eye exhibits with a single vision lens according to a distance prescription is not altered during near vision tasks, but an image in front of or on the fovea is created.

26. The computer implemented method as claimed in claim 25, further comprising:

providing a lens blank and forming a progressive spectacle lens with the optimized free-form surface from the lens blank.

\* \* \* \* \*

UNITED STATES PATENT AND TRADEMARK OFFICE
CERTIFICATE OF CORRECTION

PATENT NO. : 10,394,054 B2
APPLICATION NO. : 16/254536
DATED : August 27, 2019
INVENTOR(S) : Saulius Varnas Page 1 of 1

It is certified that error appears in the above-identified patent and that said Letters Patent is hereby corrected as shown below:

In the Claims

Column 32, Line 14, Claim 19 change "as area" to -- an area --.

Column 34, Line 23, Claim 25 change "as claims" to -- as claimed --.

Signed and Sealed this
Fourth Day of February, 2020

Andrei Iancu
*Director of the United States Patent and Trademark Office*